US008718925B2

(12) United States Patent
Letchner et al.

(10) Patent No.: US 8,718,925 B2
(45) Date of Patent: *May 6, 2014

(54) COLLABORATIVE ROUTE PLANNING FOR GENERATING PERSONALIZED AND CONTEXT-SENSITIVE ROUTING RECOMMENDATIONS

(75) Inventors: Julia M. Letchner, Seattle, WA (US); John C. Krumm, Redmond, WA (US); Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 631 days.

This patent is subject to a terminal disclaimer.

(21) Appl. No.: 12/466,308

(22) Filed: May 14, 2009

(65) Prior Publication Data

US 2009/0271104 A1    Oct. 29, 2009

Related U.S. Application Data

(63) Continuation of application No. 11/426,903, filed on Jun. 27, 2006, now Pat. No. 7,610,151.

(51) Int. Cl.
*G01C 21/30* (2006.01)

(52) U.S. Cl.
USPC ............................. 701/410; 701/424; 701/425

(58) Field of Classification Search
USPC ........... 701/209, 207, 410, 424, 425; 340/990
See application file for complete search history.

(56) References Cited

U.S. PATENT DOCUMENTS

| 4,884,208 | A | 11/1989 | Marinelli et al. |
| 4,939,663 | A | 7/1990 | Baird et al. |
| 5,187,667 | A | 2/1993 | Short et al. |
| 5,422,813 | A | 6/1995 | Schuchman et al. |

(Continued)

FOREIGN PATENT DOCUMENTS

| EP | 1519288 | 3/2005 |
| EP | 1659368 | 5/2006 |

(Continued)

OTHER PUBLICATIONS

Simon Handley, et al. Learning to Predict the Duration of an Automobile Trip. Proceedings of the Fourth International Conference on Knowledge Discovery and Data Mining. 1998, pp. 1-5, New York.

(Continued)

*Primary Examiner* — Mark Hellner
(74) *Attorney, Agent, or Firm* — Aaron Chatterjee; Raghu Chinagudabha; Micky Minhas

(57) ABSTRACT

A route-planning system is described that leverages a database of observations about routes taken by drivers in a region to generate context and/or preference sensitive routes. Contextual information such as time of day and day of week, along with such findings as the observed velocities on different roads and the efficiency of trips is noted from the database of trips to inform a route generation component. The route-generation component considers velocities, contextual information, and other findings to compute preferred routes for people requesting directions from a first geographical point to a second geographical point. In one usage, properties of a driver's own prior routes are used to generate personalized routes, including routes between previously unobserved starting and ending locations. In another application, sets of observed routes of other drivers are used in a collaborative manner to generate recommended routes for a specific driver based on inferred preferences of the driver.

20 Claims, 16 Drawing Sheets

(56) References Cited

U.S. PATENT DOCUMENTS

| | | |
|---|---|---|
| 5,444,442 A | 8/1995 | Sadakata et al. |
| 5,493,692 A | 2/1996 | Theimer et al. |
| 5,504,482 A | 4/1996 | Schreder et al. |
| 5,544,321 A | 8/1996 | Theimer et al. |
| 5,555,376 A | 9/1996 | Theimer et al. |
| 5,603,054 A | 2/1997 | Theimer et al. |
| 5,606,695 A | 2/1997 | Dworzecki |
| 5,611,050 A | 3/1997 | Theimer et al. |
| 5,629,854 A | 5/1997 | Schulte et al. |
| 5,648,768 A | 7/1997 | Bouve et al. |
| 5,774,073 A | 6/1998 | Maekawa et al. |
| 5,802,492 A | 9/1998 | DeLorme et al. |
| 5,812,069 A | 9/1998 | Albrecht et al. |
| 5,812,865 A | 9/1998 | Theimer et al. |
| 5,822,712 A | 10/1998 | Olsson |
| 5,933,094 A | 8/1999 | Goss et al. |
| 5,938,720 A | 8/1999 | Tamai |
| 5,987,374 A | 11/1999 | Akutsu et al. |
| 5,987,381 A | 11/1999 | Oshizawa |
| 6,038,444 A | 3/2000 | Schipper et al. |
| 6,047,260 A | 4/2000 | Levinson |
| 6,060,989 A | 5/2000 | Gehlot |
| 6,119,065 A | 9/2000 | Shimada et al. |
| 6,124,826 A | 9/2000 | Garthwaite et al. |
| 6,199,009 B1 | 3/2001 | Meis et al. |
| 6,199,045 B1 | 3/2001 | Giniger et al. |
| 6,216,086 B1 * | 4/2001 | Seymour et al. ............... 701/202 |
| 6,236,932 B1 | 5/2001 | Fastenrath |
| 6,240,364 B1 | 5/2001 | Kerner et al. |
| 6,249,742 B1 | 6/2001 | Friederich et al. |
| 6,253,980 B1 | 7/2001 | Murakami et al. |
| 6,298,302 B2 | 10/2001 | Walgers et al. |
| 6,314,365 B1 | 11/2001 | Smith |
| 6,317,686 B1 | 11/2001 | Ran |
| 6,321,158 B1 | 11/2001 | DeLorme et al. |
| 6,339,746 B1 | 1/2002 | Sugiyama et al. |
| 6,353,398 B1 | 3/2002 | Amin et al. |
| 6,374,182 B2 | 4/2002 | Bechtolsheim et al. |
| 6,381,533 B1 | 4/2002 | Crane et al. |
| 6,381,535 B1 | 4/2002 | Durocher et al. |
| 6,381,538 B1 | 4/2002 | Robinson et al. |
| 6,401,027 B1 | 6/2002 | Xu et al. |
| 6,401,038 B2 | 6/2002 | Gia |
| 6,415,226 B1 | 7/2002 | Kozak |
| 6,445,968 B1 | 9/2002 | Jalla |
| 6,466,232 B1 | 10/2002 | Newell et al. |
| 6,470,267 B1 | 10/2002 | Nozaki |
| 6,480,783 B1 | 11/2002 | Myr |
| 6,510,379 B1 | 1/2003 | Hasegawa et al. |
| 6,513,046 B1 | 1/2003 | Abbott, III et al. |
| 6,526,350 B2 | 2/2003 | Sekiyama |
| 6,542,811 B2 | 4/2003 | Doi |
| 6,542,812 B1 * | 4/2003 | Obradovich et al. ......... 701/207 |
| 6,549,915 B2 | 4/2003 | Abbott, III et al. |
| 6,553,313 B1 | 4/2003 | Froeberg |
| 6,567,743 B1 | 5/2003 | Mueller et al. |
| 6,571,216 B1 | 5/2003 | Garg et al. |
| 6,622,087 B2 | 9/2003 | Anderson |
| 6,629,034 B1 | 9/2003 | Kozak et al. |
| 6,636,145 B1 | 10/2003 | Murakami et al. |
| 6,640,187 B1 | 10/2003 | Chenault et al. |
| 6,640,212 B1 | 10/2003 | Rosse |
| 6,672,506 B2 | 1/2004 | Swartz et al. |
| 6,687,608 B2 | 2/2004 | Sugimoto et al. |
| 6,697,730 B2 | 2/2004 | Dickerson |
| 6,711,474 B1 | 3/2004 | Treyz et al. |
| 6,721,650 B2 | 4/2004 | Fushiki et al. |
| 6,721,654 B2 | 4/2004 | Akiyama |
| 6,741,188 B1 | 5/2004 | Miller et al. |
| 6,744,383 B1 | 6/2004 | Alfred et al. |
| 6,747,675 B1 | 6/2004 | Abbott et al. |
| D494,584 S | 8/2004 | Schlieffers et al. |
| 6,778,903 B2 | 8/2004 | Robinson et al. |
| 6,785,607 B2 | 8/2004 | Watanabe et al. |
| 6,791,580 B1 | 9/2004 | Abbott et al. |
| 6,796,505 B2 | 9/2004 | Pellaumail et al. |
| 6,801,223 B1 | 10/2004 | Abbott et al. |
| 6,812,937 B1 | 11/2004 | Abbott et al. |
| 6,813,501 B2 | 11/2004 | Kinnunen et al. |
| 6,813,558 B1 | 11/2004 | Lapstun et al. |
| 6,826,472 B1 | 11/2004 | Kamei et al. |
| 6,829,532 B2 | 12/2004 | Obradovich et al. |
| 6,837,436 B2 | 1/2005 | Swartz et al. |
| 6,842,877 B2 | 1/2005 | Robarts et al. |
| 6,847,889 B2 | 1/2005 | Park et al. |
| 6,865,482 B2 | 3/2005 | Hull |
| 6,871,137 B2 | 3/2005 | Scaer et al. |
| 6,882,930 B2 | 4/2005 | Trayford et al. |
| 6,898,432 B1 | 5/2005 | Jiang |
| 6,898,517 B1 | 5/2005 | Froeberg |
| 6,909,380 B2 | 6/2005 | Brooke |
| 6,952,559 B2 | 10/2005 | Bates et al. |
| 6,965,325 B2 | 11/2005 | Finnern |
| 6,970,131 B2 | 11/2005 | Percy et al. |
| 6,983,139 B2 | 1/2006 | Dowling et al. |
| 6,985,810 B2 | 1/2006 | Moitra et al. |
| 6,993,326 B2 | 1/2006 | Link, II et al. |
| 7,010,501 B1 | 3/2006 | Roslak et al. |
| 7,016,307 B2 | 3/2006 | Vasudev et al. |
| 7,027,915 B2 | 4/2006 | Craine |
| 7,040,541 B2 | 5/2006 | Swartz et al. |
| 7,043,356 B2 | 5/2006 | Linn |
| 7,058,506 B2 | 6/2006 | Kawase et al. |
| 7,062,376 B2 | 6/2006 | Oesterling |
| 7,063,263 B2 | 6/2006 | Swartz et al. |
| 7,069,308 B2 | 6/2006 | Abrams |
| 7,076,409 B2 | 7/2006 | Agrawala et al. |
| 7,080,139 B1 | 7/2006 | Briggs et al. |
| 7,082,364 B2 | 7/2006 | Adamczyk |
| 7,092,819 B2 | 8/2006 | Odachi et al. |
| 7,103,368 B2 | 9/2006 | Teshima |
| 7,120,444 B2 | 10/2006 | Silvester |
| 7,149,625 B2 | 12/2006 | Mathews et al. |
| 7,171,378 B2 | 1/2007 | Petrovich et al. |
| 7,195,157 B2 | 3/2007 | Swartz et al. |
| 7,196,639 B2 | 3/2007 | Joyce et al. |
| 7,212,919 B2 | 5/2007 | Chou et al |
| 7,221,928 B2 | 5/2007 | Laird et al. |
| 7,233,860 B2 | 6/2007 | Lokshin et al. |
| 7,239,960 B2 | 7/2007 | Yokota et al. |
| 7,245,925 B2 | 7/2007 | Zellner |
| 7,250,907 B2 | 7/2007 | Krumm et al. |
| 7,286,837 B2 | 10/2007 | Giniger et al. |
| 7,295,805 B2 | 11/2007 | Walker et al. |
| 7,308,236 B2 | 12/2007 | Fukushima |
| 7,376,414 B2 | 5/2008 | Engstrom |
| 7,385,501 B2 | 6/2008 | Miller et al. |
| 7,403,905 B2 | 7/2008 | Shioda et al. |
| 7,466,986 B2 | 12/2008 | Halcrow et al. |
| 7,496,484 B2 | 2/2009 | Agrawala et al. |
| 7,512,487 B1 | 3/2009 | Golding et al. |
| 7,522,995 B2 | 4/2009 | Nortrup |
| 7,587,273 B2 | 9/2009 | Ohnishi et al. |
| 7,610,151 B2 * | 10/2009 | Letchner et al. ............... 701/209 |
| 7,624,024 B2 | 11/2009 | Levis et al. |
| 7,627,414 B2 | 12/2009 | Goto et al. |
| 7,912,637 B2 | 3/2011 | Horvitz et al. |
| 7,948,400 B2 | 5/2011 | Horvitz et al. |
| 8,024,112 B2 | 9/2011 | Krumm et al. |
| 2001/0014849 A1 | 8/2001 | King et al. |
| 2001/0020211 A1 | 9/2001 | Takayama et al. |
| 2001/0025222 A1 | 9/2001 | Bechtolsheim et al. |
| 2001/0029425 A1 | 10/2001 | Myr |
| 2001/0030664 A1 | 10/2001 | Shulman et al. |
| 2001/0032121 A1 | 10/2001 | Le |
| 2001/0037271 A1 | 11/2001 | Kubota |
| 2001/0039512 A1 | 11/2001 | Nicholson |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2001/0044321 A1 | 11/2001 | Ausems et al. |
| 2001/0044693 A1 | 11/2001 | Gotou et al. |
| 2001/0055165 A1 | 12/2001 | McCarthy et al. |

(56) References Cited

U.S. PATENT DOCUMENTS

| | | |
|---|---|---|
| 2002/0004700 A1 | 1/2002 | Klein |
| 2002/0010610 A1 | 1/2002 | Jacobs et al. |
| 2002/0010615 A1 | 1/2002 | Jacobs |
| 2002/0032035 A1 | 3/2002 | Teshima |
| 2002/0032689 A1 | 3/2002 | Abbott, III et al. |
| 2002/0044152 A1 | 4/2002 | Abbott, III et al. |
| 2002/0052930 A1 | 5/2002 | Abbott et al. |
| 2002/0052963 A1 | 5/2002 | Abbott et al. |
| 2002/0054130 A1 | 5/2002 | Abbott, III et al. |
| 2002/0054174 A1 | 5/2002 | Abbott et al. |
| 2002/0055872 A1 | 5/2002 | LaBrie et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0082771 A1* | 6/2002 | Anderson ............. 701/209 |
| 2002/0083025 A1 | 6/2002 | Robarts et al. |
| 2002/0083158 A1 | 6/2002 | Abbott et al. |
| 2002/0084917 A1 | 7/2002 | Hauptman |
| 2002/0087525 A1 | 7/2002 | Abbott et al. |
| 2002/0091568 A1 | 7/2002 | Kraft et al. |
| 2002/0097193 A1 | 7/2002 | Powers |
| 2002/0099817 A1 | 7/2002 | Abbott et al. |
| 2002/0103693 A1 | 8/2002 | Bayer et al. |
| 2002/0107027 A1 | 8/2002 | O'Neil |
| 2002/0121981 A1 | 9/2002 | Munch |
| 2002/0124050 A1 | 9/2002 | Middeljans |
| 2002/0143464 A1 | 10/2002 | Blewitt |
| 2002/0167442 A1* | 11/2002 | Taylor ............. 342/357.09 |
| 2002/0169540 A1 | 11/2002 | Engstrom |
| 2002/0184091 A1 | 12/2002 | Pudar |
| 2003/0018521 A1 | 1/2003 | Kraft et al. |
| 2003/0023371 A1 | 1/2003 | Stephens |
| 2003/0043045 A1 | 3/2003 | Yasushi et al. |
| 2003/0046158 A1 | 3/2003 | Kratky |
| 2003/0046401 A1 | 3/2003 | Abbott et al. |
| 2003/0065442 A1 | 4/2003 | Touney |
| 2003/0093216 A1 | 5/2003 | Akiyama |
| 2003/0135304 A1 | 7/2003 | Sroub et al. |
| 2003/0154476 A1 | 8/2003 | Abbott, III et al. |
| 2003/0158650 A1 | 8/2003 | Abe et al. |
| 2003/0182052 A1 | 9/2003 | DeLorme et al. |
| 2003/0182183 A1 | 9/2003 | Pribe |
| 2004/0059622 A1 | 3/2004 | Mueller |
| 2004/0076279 A1 | 4/2004 | Taschereau |
| 2004/0088392 A1 | 5/2004 | Barrett et al. |
| 2004/0117195 A1 | 6/2004 | Bodin |
| 2004/0117246 A1 | 6/2004 | Applebaum |
| 2004/0143496 A1 | 7/2004 | Saenz |
| 2004/0158433 A1 | 8/2004 | Wimschneider et al. |
| 2004/0181495 A1 | 9/2004 | Grush |
| 2004/0192351 A1 | 9/2004 | Duncan |
| 2004/0193492 A1 | 9/2004 | Applebaum |
| 2004/0201500 A1 | 10/2004 | Miller et al. |
| 2004/0204848 A1 | 10/2004 | Matsuo et al. |
| 2004/0225437 A1* | 11/2004 | Endo et al. ............. 701/209 |
| 2004/0233045 A1 | 11/2004 | Mays |
| 2004/0243305 A1 | 12/2004 | Kozak ............. 701/209 |
| 2005/0004757 A1 | 1/2005 | Neeman et al. |
| 2005/0027444 A1 | 2/2005 | Kim |
| 2005/0034078 A1 | 2/2005 | Abbott et al. |
| 2005/0038596 A1 | 2/2005 | Yang et al. |
| 2005/0049765 A1 | 3/2005 | Chetia et al. |
| 2005/0085997 A1 | 4/2005 | Park |
| 2005/0102098 A1* | 5/2005 | Montealegre et al. ........ 701/209 |
| 2005/0125148 A1 | 6/2005 | Van Buer et al. |
| 2005/0132024 A1 | 6/2005 | Habaguchi et al. |
| 2005/0140524 A1 | 6/2005 | Kato et al. |
| 2005/0165762 A1 | 7/2005 | Bishop |
| 2005/0197764 A1 | 9/2005 | Wolf |
| 2005/0198287 A1 | 9/2005 | Sauve et al. |
| 2005/0216182 A1 | 9/2005 | Hussain et al. |
| 2005/0234758 A1 | 10/2005 | Nishi |
| 2005/0256754 A1 | 11/2005 | Nastacio |
| 2005/0266858 A1 | 12/2005 | Miller et al. |
| 2005/0267651 A1 | 12/2005 | Arango et al. |
| 2005/0272442 A1 | 12/2005 | Miller et al. |
| 2005/0288849 A1 | 12/2005 | Rothman et al. |
| 2006/0019676 A1 | 1/2006 | Miller et al. |
| 2006/0041379 A1 | 2/2006 | Brulle-Drews |
| 2006/0041500 A1 | 2/2006 | Diana et al. |
| 2006/0053038 A1 | 3/2006 | Warren et al. |
| 2006/0058947 A1 | 3/2006 | Schalk |
| 2006/0074531 A1 | 4/2006 | Saarinen et al. |
| 2006/0095374 A1 | 5/2006 | Lo et al. |
| 2006/0123053 A1 | 6/2006 | Scannell |
| 2006/0129313 A1 | 6/2006 | Becker et al. |
| 2006/0135180 A1 | 6/2006 | Jakel et al. |
| 2006/0143183 A1 | 6/2006 | Goldberg et al. |
| 2006/0190168 A1 | 8/2006 | Ohnishi et al. |
| 2006/0218225 A1 | 9/2006 | Hee Voon et al. |
| 2006/0235739 A1 | 10/2006 | Levis et al. |
| 2006/0241859 A1 | 10/2006 | Kimchi et al. |
| 2006/0241862 A1 | 10/2006 | Ichihara et al. |
| 2006/0247852 A1 | 11/2006 | Kortge et al. |
| 2006/0265119 A1 | 11/2006 | McMahan et al. |
| 2006/0270421 A1 | 11/2006 | Phillips et al. |
| 2006/0291396 A1 | 12/2006 | Hamilton et al. |
| 2007/0005233 A1 | 1/2007 | Pinkus et al. |
| 2007/0016362 A1 | 1/2007 | Nelson |
| 2007/0027593 A1 | 2/2007 | Shah et al. |
| 2007/0032947 A1 | 2/2007 | Yamada et al. |
| 2007/0050240 A1 | 3/2007 | Belani et al. |
| 2007/0050248 A1 | 3/2007 | Huang et al. |
| 2007/0050279 A1 | 3/2007 | Huang et al. |
| 2007/0061057 A1 | 3/2007 | Huang et al. |
| 2007/0061838 A1 | 3/2007 | Grubbs et al. |
| 2007/0073480 A1 | 3/2007 | Singh |
| 2007/0073841 A1 | 3/2007 | Ryan et al. |
| 2007/0078729 A1 | 4/2007 | Brown |
| 2007/0093258 A1 | 4/2007 | Steenstra et al. |
| 2007/0100805 A1 | 5/2007 | Ramer et al. |
| 2007/0106465 A1 | 5/2007 | Adam et al. |
| 2007/0106468 A1 | 5/2007 | Eichenbaum et al. |
| 2007/0128900 A1 | 6/2007 | Bauman |
| 2007/0129082 A1 | 6/2007 | Thacher |
| 2007/0146200 A1 | 6/2007 | Norin et al. |
| 2007/0156326 A1 | 7/2007 | Nesbitt |
| 2007/0176796 A1 | 8/2007 | Bliss et al. |
| 2007/0203644 A1 | 8/2007 | Thota et al. |
| 2007/0208495 A1 | 9/2007 | Chapman et al. |
| 2007/0210937 A1 | 9/2007 | Smith et al. |
| 2007/0218900 A1 | 9/2007 | Abhyanker |
| 2007/0219717 A1 | 9/2007 | Chang |
| 2007/0225882 A1 | 9/2007 | Yamaguchi et al. |
| 2007/0244627 A1 | 10/2007 | Boss et al. |
| 2007/0250259 A1 | 10/2007 | Dare |
| 2007/0257792 A1 | 11/2007 | Gold |
| 2007/0293958 A1 | 12/2007 | Stehle et al. |
| 2007/0299599 A1 | 12/2007 | Letchner et al. |
| 2008/0015763 A1 | 1/2008 | Kitazaki et al. |
| 2008/0033644 A1 | 2/2008 | Bannon |
| 2008/0046134 A1 | 2/2008 | Bruce et al. |
| 2008/0046165 A1 | 2/2008 | Downs et al. |
| 2008/0090591 A1 | 4/2008 | Miller et al. |
| 2008/0091537 A1 | 4/2008 | Miller et al. |
| 2008/0161018 A1 | 7/2008 | Miller et al. |
| 2008/0200312 A1 | 8/2008 | Tagliabue |
| 2008/0293430 A1 | 11/2008 | Blom et al. |
| 2008/0312819 A1 | 12/2008 | Banerjee |
| 2009/0005973 A1 | 1/2009 | Salo et al. |
| 2009/0012703 A1 | 1/2009 | Aso et al. |
| 2009/0048771 A1 | 2/2009 | Speier et al. |
| 2009/0082917 A1 | 3/2009 | Adachi |
| 2009/0248292 A1 | 10/2009 | Adachi et al. |
| 2010/0036610 A1 | 2/2010 | Urciuoli et al. |

FOREIGN PATENT DOCUMENTS

| | | |
|---|---|---|
| JP | 2000258174 | 9/2000 |
| JP | 2002131065 | 5/2002 |
| JP | 2002156234 A | 5/2002 |
| JP | 2002230696 | 8/2002 |
| JP | 2003216989 | 7/2003 |
| JP | 2007232610 | 9/2007 |

(56) References Cited

FOREIGN PATENT DOCUMENTS

| | | |
|---|---|---|
| KR | 102006001683 A | 2/2006 |
| WO | 9800787 | 1/1998 |
| WO | 9854682 | 12/1998 |
| WO | 0002389 | 1/2000 |
| WO | 0108413 | 2/2001 |
| WO | 0163451 | 8/2001 |
| WO | 0193070 | 12/2001 |
| WO | 0239367 | 5/2002 |
| WO | 03019478 | 3/2003 |
| WO | 03042950 | 5/2003 |
| WO | 03063521 | 7/2003 |
| WO | 2004021306 | 3/2004 |
| WO | 2004084437 | 9/2004 |
| WO | 2005024667 A1 | 3/2005 |
| WO | 2005036471 | 4/2005 |
| WO | 2007131225 | 11/2007 |

OTHER PUBLICATIONS

John Fawcett, et al. Adaptive Routing for Road Traffic. IEEE Computer Graphics and Applications. May/Jun. 2000, pp. 46-53. vol. 20, No. 3.
Toshihiko Oda, et al. Evaluation of Measured Travel Time Utilizing Two-way Communication in UTMS. Third World Congress on Intelligent Transport Systems. 1996. Orlando, Florida.
Karen Zita Haigh, et al. Exploiting Domain Geometry in Analogical Route Planning. Journal of Experimental and Theoretical AI, 1997. pp. 509-541. vol. 9, No. 4.
John Krumm, et al. The Microsoft Multiperson Location Survey. Aug. 2005, pp. 1-4. Microsoft Research.
Lawrence R. Rabiner. A Tutorial on Hidden Markov Models and Selected Applications in Speech Recognition. Proceedings of the IEEE. Feb. 1989. Volume 77, No. 2. pp. 257-286.
Auto Route. http://www.microsoft.com/uk/homepc/autoroute/see/default.mspx. Last accessed on Mar. 1, 2006. 2006 Microsoft Corporation.
Take a Free Trip on Auto-Pilot. http://www.freetrip.com/. Last accessed on Mar. 1, 2006. 2 pgs.
Jeff Kurtz, et al. Map Navigation Experiment. http://www.itl.nist.gov/iaui/vvrg/nist-icv/experiments/mapnav/mapnav.html. Last accessed on Mar. 1, 2006. 3 pgs.
Stefan Edelkamp, et al. Route planning and map inference with global positioning traces. Computer Science in Perspective. 2003. pp. 128-151. Springer-Verlag New York, Inc.
William H. K. Lam. Comparison of two non-parametric models for daily traffic forecasting in Hong Kong. Journal of Forecasting. Feb. 27, 2006. 2 pgs. John Wiley & Sons, Ltd.
Raffaele Bolla. A new model for network traffic forecast based on user's mobility in cellular networks with highway stretches. International Journal of Communication Systems. Sep. 22, 2004. pp. 911-934. vol. 17, Issue 10. John Wiley & Sons, Ltd.
Joao Paulo Barros. Activities as Behaviour Aspects. http://lglwww.epfl.ch/workshops/uml2002/papers/barros.pdf. Last accessed on Mar. 3, 2006. 6 pgs.
K Meister, et al. Generating daily activity schedules for households using Genetic Algorithms. 5th Swiss Transport Research Conference. Mar. 9-11, 2005. 26 pgs. Monte Verità / Ascona.
S.T. Doherty, et al. The Development of a Unified Modeling Framework for the Household Activity-Travel Scheduling Process. Traffic and Mobility: Simulation-Economics-Environment, eds. W. Brilon, F. Huber, M. Schreckengerg, and H. Wallentowitzpp. pp. 35-56. Berlin: Springer.
Has ITS4mobility the capability to ensure reliable operation and realistic prediction of vehicle arrival and/or departure times? http://www.volvo.com/mobilitysystems/global/en-gb/FAQ/RealisticPredictionsArrivals.htm. Last accessed on Mar. 2, 2006.
TriMet Transit Tracker Implementation. Innovations in Public Transit. Jan. 4, 2005. 7 pgs.
Daniel Ashbrook, et al. Enabling Ad(Hoc Collaboration Through Schedule Learning and Prediction. http://www-static.cc.gatech.edu/fac/Thad.Stamer/p/031_20_Activity/chi_mobihoc-2002.pdf. Last accessed on Mar. 2, 2006. 4 pgs.
Mattias Östergren, et al. Road Talk: A Roadside Location-Dependent Audio Message System for Car Drivers. Journal of Mobile Multimedia. Feb. 25, 2005. pp. 47-61. vol. 1, No. 1. Rinton Press.
Joseph Schwartz. Microsoft Releases MapPoint 2002. Directions Magazine. Apr. 24, 2001. pp. 1-4. Directions Media. Glencoe, IL.
Oscar Franzese, et al. Traffic Simulation Application to Plan Real-Time Distribution Routes. Proceedings of the 2002 Winter Simulation Conference. 2002. pp. 1214-1218.
B.L. Smith, et al. Meeting Real-Time Traffic Flow Forecasting Requirements with Imprecise Computations. Computer-Aided Civil and Infrastructure Engineering. May 2003. pp. 201-213. vol. 18, No. 3. Blackwell Publishing.
Fastcommute. http://home.earthlink.net/~fastcommute/. Last accesses on Mar. 1, 2006.
Andy Harter, et al., A Distributed Location System for the Active Office, IEEE Network, 1994, pp. 62-70.
Guanling Chen, et al., A Survey of Context-Aware Mobile Computing Research, Dartmouth Computer Science Technical Report, 2000, 16 pages.
William Noah Schilt, A System Architecture for Context-Aware Mobile Computing, Columbia University, 1995, 153 pages.
Mike Spreitzer, et al., Providing Location Information in a Ubiquitous Computing Environment, SIGOPS '93, 1993, pp. 270-283.
Marvin Theimer, et al., Operating System Issues for PDAs, in Fourth Workshop on Workstation Operating Systems, 1993, 7 pages.
Roy Want, Active Badges and Personal Interactive Computing Objects, IEEE Transactions on Consumer Electronics, 1992, 11 pages, vol. 38—No. 1.
Bill N. Schilit, et al., The ParcTab Mobile Computing System, IEEE WWOS-IV, 1993, 4 pages.
Bill Schilit, et al., Context-Aware Computing Applications, In Proceedings of the Workshop on Mobile Computing Systems and Applications, Dec. 1994. pp. 85-90.
Bill N. Schilit, et al., Customizing Mobile Applications, Proceedings USENIX Symposium on Mobile and Location Independent Computing, Aug. 1993, 9 pages.
Mike Spreitzer, et al., Architectural Considerations for Scalable, Secure, Mobile Computing with Location Information, In the 14th International Conference on Distributed Computing Systems, Jun. 1994, pp. 29-38.
Mike Spreitzer et al., Scalable, Secure, Mobile Computing with Location Information, Communications of the ACM, Jul. 1993, 1 page, vol. 36—No. 7.
Roy Want, et al., The Active Badge Location System, ACM Transactions on Information Systems, Jan. 1992, pp. 91-102, vol. 10—No. 1.
Mark Weiser, Some Computer Science Issues in Ubiquitous Computing, Communications of the ACM, Jul. 1993, pp. 75-84, vol. 36—No. 7.
M. Billinghurst, et al., An Evaluation of Wearable Information Spaces, Proceedings of the Virtual Reality Annual International Symposium, 1998, 8 pages.
Bradley J. Rhodes, Remembrance Agent: A continuously running automated information retrieval system, The Proceedings of the First International Conference on the Practical Application of Intelligent Agents and Multi Agent Technology, 1996, pp. 487-495.
Eric Horvitz, et al., In Pursuit of Effective Handsfree Decision Support: Coupling Bayesian Inference, Speech Understanding, and User Models, 1995, 8 pages.
Bradley J. Rhodes, The Wearable Remembrance Agent: A System for Augmented Theory, The Proceedings of the First International Symposium on Wearable Computers, Oct. 1997, pp. 123-128.
Eric Horvitz, et al., Attention-Sensitive Alerting in Computing Systems, Microsoft Research, Aug. 1999.
Bill N. Schilit, et al., Disseminationg Active Map Information to Mobile Hosts, IEEE Network, 1994, pp. 22-32, vol. 8—No. 5.
Mark Billinghurst, et al., Wearable Devices: New Ways to Manage Information, IEEE Computer Society, Jan. 1999, pp. 57-64.

(56) References Cited

OTHER PUBLICATIONS

Thad Eugene Starner, Wearable Computing and Contextual Awareness, Massachusetts Institute of Technology, Jun. 1999, 248 pages.
Bradley J. Rhodes, The Wearable Remembrance Agent: A System for Augmented Memory, Personal Technologies Journal Special Issue on Wearable Computing, 1997, 12 pages.
Workshop on Wearable Computing Systems, Aug. 19-21, 1996.
Mark Billinghurst, Research Directions in Wearable Computing, University of Washington, May 1998, 48 pages.
Mark Weiser, The Computer for the 21st Century, Scientific American, Sep. 1991, 8 pages.
T. Joachims, Text categorization with support vector machines: learning with many relevant features, Machine Learning, European Conference on Machine Learning, Apr. 21, 1998, pp. 137-142.
International Search Report dated Sep. 29, 2003 for PCT Application Serial No. 00/20685, 3 Pages.
Robert M. Losee, Jr., Minimizing information overload: the ranking of electronic messages, Journal of Information Science 15, Elsevier Science Publishers B.V., 1989, pp. 179-189.
Non-Final Office Action mailed Oct. 30, 2013 in U.S. Appl. No. 11/957,219, 5 pages.
Non-Final Office Action mailed Apr. 27, 2011 in U.S. Appl. No. 11/957,127, 11 pages.
Final Office Action mailed Oct. 5, 2011 in U.S. Appl. No. 11/957,127, 10 pages.
Non-Final Office Action mailed Mar. 13, 2012 in U.S. Appl. No. 11/957,127, 8 pages.
Notice of Allowance mailed Dec. 21, 2012 in U.S. Appl. No. 11/957,127, 8 pages.
Non-Final Office Action mailed Mar. 8, 2011 in U.S. Appl. No. 11/957,115, 8 pages.
Final Office Action mailed Aug. 29, 2011 in U.S. Appl. No. 11/957,115, 8 pages.
Non-Final Office Action mailed Mar. 25, 2011 in U.S. Appl. No. 11/957,219, 6 pages.
Restriction Requirement mailed Sep. 28, 2011 in U.S. Appl. No. 11/957,219, 5 pages.
Final Office Action mailed Jan. 24, 2012 in U.S. Appl. No. 11/957,219, 5 pages.
Non-Final Office Action mailed Aug. 17, 2010 in U.S. Appl. No. 12/033,690, 25 pages.
Final Office Action mailed Feb. 1, 2011 in U.S. Appl. No. 12/033,690, 26 pages.
Non-Final Office Action mailed Jun. 13, 2011 in U.S. Appl. No. 12/033,690, 28 pages.
Final Office Action mailed Dec. 1, 2011 in U.S. Appl. No. 12/033,690, 29 pages.
Non-Final Office Action mailed Mar. 27, 2013 in U.S. Appl. No. 12/033,690, 35 pages.
Non-Final Office Action mailed Aug. 17, 2010 in U.S. Appl. No. 12/033,652, 21 pages.
Final Office Action mailed Mar. 18, 2011 in U.S. Appl. No. 12/033,652, 23 pages.
Non-Final Office Action mailed Aug. 9, 2011 in U.S. Appl. No. 12/033,652, 28 pages.
Final Office Action mailed Feb. 1, 2012 in U.S. Appl. No. 12/033,652, 34 pages.
Non-Final Office Action mailed Apr. 19, 2013 in U.S. Appl. No. 12/033,652, 27 pages.
Non-Final Office Action mailed Mar. 29, 2011 in U.S. Appl. No. 12/033,627, 12 pages.
Final Office Action mailed Sep. 14, 2011 in U.S. Appl. No. 12/033,627, 13 pages.
Non-Final Office Action mailed Mar. 28, 2012 in U.S. Appl. No. 12/033,627, 12 pages.
Final Office Action mailed Nov. 16, 2012 in U.S. Appl. No. 12/033,627, 12 pages.
Non-Final Office Action mailed May 8, 2013 in U.S. Appl. No. 12/033,627, 12 pages.
Non-Final Office Action mailed Mar. 30, 2011 in U.S. Appl. No. 11/957,188, 17 pages.
Final Office Action mailed Nov. 16, 2011 in U.S. Appl. No. 11/957,188, 13 pages.
Non-Final Office Action mailed Nov. 15, 2012 in U.S. Appl. No. 11/957,188, 12 pages.
Notice of Allowance mailed Mar. 1, 2013 in U.S. Appl. No. 11/957,188, 6 pages.
Restriction Requirement mailed May 27, 2011 in U.S. Appl. No. 11/957,139, 6 pages.
Non-Final Office Action mailed Jul. 21, 2011 in U.S. Appl. No. 11/957,139, 16 pages.
Final Office Action mailed Jan. 13, 2012 in U.S. Appl. No. 11/957,139, 16 pages.
Non-Final Office Action mailed Aug. 14, 2013 in U.S. Appl. No. 11/957,139, 15 pages.
Non-Final Office Action mailed Nov. 19, 2010 in U.S. Appl. No. 11/957,206, 12 pages.
Final Office Action mailed Apr. 21, 2011 in U.S. Appl. No. 11/957,206, 12 pages.
Non-Final Office Action mailed Aug. 23, 2011 in U.S. Appl. No. 11/957,206, 13 pages.
Final Office Action mailed Dec. 22, 2011 in U.S. Appl. No. 11/957,206, 11 pages.
Non-Final Office Action mailed May 15, 2012 in U.S. Appl. No. 11/957,206, 10 pages.
Final Office Action mailed Aug. 22, 2012 in U.S. Appl. No. 11/957,206, 8 pages.
Non-Final Office Action mailed Oct. 6, 2011 in U.S. Appl. No. 11/957,151, 17 pages.
Final Office Action mailed Apr. 12, 2012 in U.S. Appl. No. 11/957,151, 15 pages.
Non-Final Office Action mailed May 8, 2013 in U.S. Appl. No. 11/957,151, 16 pages.
Non-Final Office Action mailed Aug. 23, 2010 in U.S. Appl. No. 11/957,210, 16 pages.
Final Office Action mailed Dec. 13, 2010 in U.S. Appl. No. 11/957,210, 14 pages.
Non-Final Office Action mailed May 3, 2011 in U.S. Appl. No. 11/957,210, 13 pages.
Notice of Allowance mailed Oct. 27, 2011 in U.S. Appl. No. 11/957,210, 5 pages.
Non-Final Office Action mailed Mar. 30, 2011 in U.S. Appl. No. 11/957,167, 9 pages.
Non-Final Office Action mailed Nov. 1, 2010 in U.S. Appl. No. 11/957,182, 7 pages.
Final Office Action mailed Feb. 14, 2011 in U.S. Appl. No. 11/957,182, 9 pages.
Notice of Allowance mailed Aug. 24, 2011 in U.S. Appl. No. 11/957,182, 8 pages.
MPOS AdSpace http://www.xiam.com/xiam.products.adspace.shtml. Last accessed Oct. 5, 2007, 1 page.
Design and Implementation of Location-Based Wireless Targeted Advertising, Proc. SPIE vol. 4586, p. 291-297, Wireless and Mobile Communications. http://adsabs.harvard.edu/abs/2001SPIE.4586..291L. Last accessed Oct. 5, 2007, 2 pages.
Toshihiro Osaragi, et al. Map Element Extraction Model for Pedestrian Route Guidance Maphttp://ieeexplore.ieee.org/xpl/freeabs_all.jsp?arnumber=1532626. Last accessed Oct. 3, 2007, 10 pages.
S. P. Hoogendoorn, et al. Pedestrian Route-Choice and Activity Scheduling Theory and Models, Transportation Research Part B 38 (2004) 169-190, doi:10.1016/S0191-2615(03)00007-9, Elsevier Lld. The Netherlands. http://www.pedestrians.tudelft.nl/publicationsITR%20B%2004%20rc.pdf. Last accessed Oct. 3, 2007,22 pages.
Alexandra Millonig, et al. Developing Landmark-Based Pedestrian Navigation Systems, Digital Object Identifier 10.1109IT1TS.2006.889439, 1524-9050, IEEE Transactions on Intelligent Transportation Systems vol. 8, No. 1, Mar. 2007. http://ieexplore.ieee.org/xpl/freeabs_all.jsp?arnumber=1520046. Last accessed Oct. 3, 2007, 7 pages.

(56) References Cited

OTHER PUBLICATIONS

Srihari Narsimhan, et al. Methods for Optimal Pedestrian Task Scheduling and Routing http://www.cs.nott.ac.ukl-rxq/PlanSIG/narasimhan.pdf. Last accessed Oct. 3, 2007, 8 pages.

Gunther Retscher, et al. NAVIO—A Navigation and Guidance Service for Pedestrians. Journal of GI Positioning Systems (2004), vol. 3, No. 1-2: 208-217 http://www.gmal.unsw.edu.au/wang/jgps/v3nl2/v3nl2p26.pdf. Last accessed Oct. 3, 2007, 10 pages.

About Amaze, 2000-2007 LocatioNet Systems Ltd http://www.amazegps.com/docs/amAze_UM_en%203.1.pdf. Last accessed Oct. 4, 2007, 37 pages.

Route 66 Mobile 7 for Nokia Series 60 Mobile Phones Launched in North America, Dec. 8, 2005, Sl. Louis, Mo. http://www.66.com/route66/news.php?cid=US&sec=0&ssec=9&news=555. Last accessed Oct. 4, 2007, 2 pages.

Vijoy Pandey, et al. Exploiting User Profiles to Support Differentiated Services in Next-Generation Wireless Networks. Jul. 15, 2002 http://networks.cs.ucdavis.edu/-ghosal/Research/publications/vijoy-profiling-network-magazine.pdf. Last accessed Oct. 4, 2007, 23 pages.

Mapouest Business Solutions Advantage APITM http://cdn.mapquest.com/corpb2b/bsolutions-advantageapi-pdf-whitepaper.pdf. Last accessed Oct. 4, 2007, 22 pages.

Route Guidance That Won't Replace One Jam with Another', m.logistics, Man/Jun. 2005, Issue 17. http://www.mlogmag.com/magazinel17/route-guidance.shtml. Last accessed Oct. 4, 2007, 3 pages.

New Magellan (Thales) MAESTR04000 Vehicle Navigation System http://cgi.ebay.com/NEW-MAESTR04000-Vehicle-Navigation-System-980919-01_WOOOitemZII016391503700ihZOOIOOcategoryZ7333200crndZViewItem. Last accessed Oct. 4, 2007, 5 pages.

Moshe Ben-Akiva, et al. Development of a Route Guidance Generation System for Real-Time Application http://rosowww.epfl.ch/mbi/papers/chania.pdf. Last accessed Apr. 10, 2007, 6 pages.

W.-T. Balke, et al. A Situation-aware Mobile Traffic Information System http://www.13s.de/-balke/paper/hicss03.pdf. Last accessed Apr. 10, 2007, 10 pages.

Keri Schreiner. Where We At? Mobile Phones Bring GPS to the Masses, May/Jun. 2007, Published by the IEEE Computer Society, 0272-1716/07 http://www.computer.org/portal/cms_docs_cga/cga/contenIIPromo/g3006_07.pdf. Last accessed Oct. 4, 2007, 6 pages.

Alan Mislove, et al. Exploiting Social Networks for Internet Searchhttp://www.mpi-sws.mpg.de/-amislove/publications/PeerSpective-HotNets.pdf. Last accessed Oct. 3, 2007, 6 pages.

Antonio Kruger, et al. The Connected User Interface: Realizing a Personal Situated Navigation Service. IU1'04, Jan. 13-16, 2004, Madeira, Funchal, Portugal. ACM 1-58113-815-6/04/0001 www.medien.ifi.lmu.de/pubdb/publications/pub/butz2004userinterface/butz2004userinterface.pdf. Last accessed Oct. 3, 2007, 8 pages.

Managing Demand Through Travel Information Services, U.S. Department of Transportation, Federal Highway Administration http://ops.fhwa.dot.gov/publications/manag_demand_tis/travelinfo.htm. Last accessed Oct. 3, 2007, 33 pages.

Boualem Benatallah, et al. OCEAN—Scalable and Adaptive Infrastructure for On-board Information Access, UNSW-CSE-TR-0601, Jan. 2006. http://www.cse.unsw.edu.auHlibman/papers/unsw601.pdf. Last accessed Oct. 3, 2007, 14 pages.

N. Hristova, et al. Ad-Me: A Context-Sensitive Advertising System http://www.cs.ucd.ie/csprism/publications/Ericsson-UCD/HriAdme01 ii.pdf. Last accessed Oct. 3, 2007, 10 pages.

Alessandra Agostini, et al. Integrated Profile Management for Mobile Computing http://webmind.dico.unimi.itlpapers/Al2lA.pdf. Last accessed Oct. 3, 2007, 5 pages.

Franziska Klugel, et al. Route Decision Behaviour in a Commuting Scenario: Simple Heuristics Adaptation and Effect of Traffic Forecast. Journal of Artificial Societies and Social Simulation vol. 7, No. 1. Published: Jan. 31, 2004. http://jasss.soc.surrey.ac.ukl71111.html. Last accessed Dec. 11, 2007, 21 pages.

Field Service Route Optimization for Energy and Cost Efficiency http://www.californiagreensolutions.com/cgi-bin/glltpl.h,content=381. Last accessed Dec. 10, 2007, 2 pages.

Modelling the impact of incentives on route choice and traffic safety using a route choice simulator experiment http://www.aida.utwente.nl/NieuwsNacancLAIDA-STOK_pilol.whlinkl. Last accessed Dec. 11, 2007, 7 pages.

Mohamed A. Abedel-Aty, et al. Impact of ATIS on Drivers' Decisions and Route Choice: A Literature Review, University of California, Davis. UCB-ITS-PRR-93-11, Sep. 1993, ISSN 10551425 http://repositories.cdlib.org/cgi/viewcontenl.cgi?article=1254&context=its/path. Last accessed Dec. 7, 2007, 48 pages.

Christine M. Johnson. The National ITS Program: Where We've Been and Where We're Going http://66.1 02.1.1 04/scholar?hl=en&lr=&q=cachr:flK6zDerzTQJ:plan20p. fhwa.dol.gov/pdfs/Pdfl/Edl03531.pdf. Last accessed Dec. 11, 2007, 12 pages.

Federal Highway Administration FHWA Domestic Pedestrian Safety Scanning Tour, September 1 02.1 .1 04/scholar?h l=en&lr=&q=cache :3cGz2QG EKH kJ :www.cdtcmpo.org/bike/pedsafety.pdf. Last accessed Dec. 11, 2007, 64 pages.

Lisa J. Molnar, et al. Developing Information Systems for the Driving Tourist: A Literature Review, Feb. 1996. http://66.1 02.1.1 04/scholar?hl=en&lr=&q=cache:3cGJzx9CvxhCQJ:sambuca.umdl.umich.edu:80801/handle/2027.42/1160. Last accessed Dec. 11, 2007, 81 pages.

Martin O'Hara. Automated Congestion Charge Payment Scheme Using Smartnav Intelligent Satellite Navigation System, Apr. 13, 2005. Last accessed Dec. 11, 2007, 7 pages. http://www.tridatacom.co. ukiDownloads/papers/Papers/Rl N%20Congestion%20 130405 .pdf.

James Baring. The Solution to the Traffic Congestion Problem, Dec. 1, 2006. http://revelstoke.org.uklgsmpccs.htm. Last accessed Dec. 11, 2007, 5 pages.

Atlanta Unveils Traffic Reduction Plan, posted Aug. 28, 2007. http://www.environmentaldefense.org/article .cfm?contentl 0=6812. Last accessed Dec. 11, 2007, 1 page.

Goncalo Correia, et al. Car Pooling Clubs: Solution for the Affiliation Problem in Traditional/Dynamic Ridesharing Systems http://www.iasi.cnr.itlewgtl16conference/ID92.pdf. 6 pages.

Pilot Tests of Dynamic Ridesharing, updated Jan. 23, 2007. http://www.ridenow.org/ridenow_summary.html. Last accessed Dec. 11, 2007, 35 pages.

iCarpool http://www.icarpool.com/enlTransportationPlanner.htm. Last accessed Dec. 11, 2007, 2 pages.

Ecolane Dynamic CarpoolTM, Ecolane Finland Oy 2006. http://www.ecolane.com/services/carpool/index.html. Last accessed Dec. 11, 2007, 1 page.

Route Planner, vol. 3 -Modules, (Route Planner—Sep. 6, 2002—LA-UR-00-1767—TRANSIMS 3.0). http://ndssl.vbi.v1.edu/PublicationsITransimsVol3Ch4.pdf. Last accessed Dec. 11, 2007,60 pages.

Meredith Williams. Reduce Stress and Stay Organized While Running Errands http://www.microsoft.com/athome/intouch/directions.mspx. Last accessed Dec. 11, 2007, 3 pages.

Non-Final Office Action mailed Sep. 3, 2013 in U.S. Appl. No. 12/033,652, 28 pages.

U.S. Appl. No. 11/957,115, filed Dec. 14, 2007, Ruston Panabaker, et al.

U.S. Appl. No. 12/033,690, filed Feb. 19, 2008, Neil W. Black, et al.
U.S. Appl. No. 12/033,652, filed Feb. 19, 2008, Ivan J. Tashev, et al.
U.S. Appl. No. 12/033,627, filed Dec. 14, 2007, Jeffrey D. Couckuyt, et al.

U.S. Appl. No. 11/957,139, filed Dec. 14, 2007, Neil W. Black, et al.
U.S. Appl. No. 11/957,151, filed Dec. 14, 2007, Michael Lewis Seltzer, et al.

U.S. Appl. No. 11/957,127, filed Dec. 14, 2007, Michael Lewis Seltzer, et al.

U.S. Appl. No. 11/957,219, filed Dec. 14, 2007, Ivan J. Tashev, et al.
U.S. Appl. No. 11/957,188, filed Dec. 14, 2007, John C. Krumm, et al.

U.S. Appl. No. 11/957,206, filed Dec. 14, 2007, Ruston Panabaker, et al.

U.S. Appl. No. 11/957,210, filed Dec. 14, 2007, Ivan J. Tashev, et al.

(56) References Cited

OTHER PUBLICATIONS

U.S. Appl. No. 11/957,182, filed Dec. 14, 2007, Jeffrey D. Couckuyt, et al.
TomTom Itinerary Planning http://www.gpsreview.netltomtom-itinerary-planning/. Last accessed Dec. 11, 2007, 12 pages.
Broadhurst, et al., Monte Carlo Road Safety Reasoning, presented at the IEEE Intelligent Vehicle Symposium (IV2005), IEEE, 6 pages.
International Search Report with Written Opinion dated Aug. 24, 2009 (PCT/US2009/030377), 12 pages.
International Search Report with Written Opinion dated Aug. 24, 2009 (PCT/US2009/030380), 13 pages.
International Search Report with Written Opinion dated Jun. 29, 2009 (PCT/US2008/083543).
International Search Report with Written Opinion dated Jun. 22, 2009 (PCT/US2008/083538).
Final Office Action mailed Sep. 23, 2013 in U.S. Appl. No. 12/033,627, 12 pages.

\* cited by examiner

COLLABORATIVE ROUTE PLANNING FOR GENERATING PERSONALIZED AND CONTEXT-SENSITIVE ROUTING RECOMMENDATIONS

CROSS REFERENCE TO RELATED APPLICATIONS

This application is a continuation of U.S. patent application Ser. No. 11/426,903, filed on Jun. 27, 2006 entitled COLLABORATIVE ROUTE PLANNING FOR GENERATING PERSONALIZED AND CONTEXT-SENSITIVE ROUTING RECOMMENDATIONS, which application is incorporated herein by reference in its entirety.

BACKGROUND

Computer-driven route planning applications are utilized every day to aid users in locating points of interest, such as particular buildings, addresses, and the like. Additionally, in several existent commercial applications users can vary a zoom level, thereby enabling variation of context and detail as a zoom level of a map is altered. For example, as a user zooms in on a particular location, details such as names of local roads, identification and location of police and fire stations, identification and location of public services, such as libraries, museums, and the like can be provided to the user. When zooming out, the user can glean information from the map such as location of the point of interest within a city, state, and/or country, proximity of the point of interest to major freeways, proximity of the point of interest to a specific city, and the like. In some applications, satellite images can be utilized to provide users with additional detail regarding a particular geographic location or region. For example, a prospective purchaser of a house can obtain an overhead satellite image of the house, thereby enabling the prospective purchaser to view lines of occupation, proximity of the house to other adjacent houses, and other information that may be pertinent to the user.

Furthermore, conventional computer-implemented mapping applications often include route planning applications that can be utilized to provide users with directions between different locations. Pursuant to an example, a user can provide a route planning application with a beginning point of travel and an end point of travel (e.g., beginning and ending addresses). The route planning application can include or utilize representations of roads and intersections and one or more algorithms to output a suggested route of travel. These algorithms can output routes depending upon user-selected parameters. For instance, a commercial route planning application can include a check-box that enables a user to specify that she wishes to avoid highways. Similarly, a user can inform the route planning application that they wish to travel on a shortest route or a route that takes a least amount of time (as determined by underlying algorithms).

Over the last several years, individuals have grown to increasingly rely on route planning applications to aid them in everything from locating a friend's house to planning cross-country road trips.

In the general case, a set of feasible streets are considered and a search algorithm is used to create a route that optimizes some objective function such as minimizing total distance or time to travel between two points. To perform optimization, a search method is applied to search among and to identify best routes between two or more locations. Search methods include comprehensive combinatorial search, or more efficient methods such as the Dykstra search algorithm, or A* search.

Route planning applications are also no longer confined to desktop computers. Rather, many automobile models are now equipped with standard mapping functionality, wherein the automobiles include graphical displays on a console to provide mapping data and directions to a user. Oftentimes, a compact disk or other storage medium that includes data to enable utilization of route-planning functionality must be purchased and loaded prior to use of the route planning application. As road conditions change, such as speed limits, number of lanes, etc., updates can be provided. Automobiles with GPS functionality (or other location identifying functionality) can additionally include real-time directions, wherein directions are provided to users of the automobile while they travel.

These route planners are fairly reliable in connection with details such as posted speed limits, location of one-way streets, and related information. However, conventional applications that include route-planning functionality make assumptions regarding the state of roads. With more specificity, today's route planning applications are built around assumptions of constancy and universality, such that optimal routes provided by the applications are independent of time of day, day of week, and detailed user preferences. In actuality, however, these assumptions do not hold. For example, in many instances, a best route between two points during rush hour in an urban area is not an optimal route at midnight between the same two points. Conventional route planning applications, however, do not take such context into account when providing routes for users. Similarly, different drivers may prefer different routes between the same two points. For example, one driver may avoid highways or particularly difficult merges, or is willing to extend duration of a journey by a few minutes in order to follow a scenic coastal road, while the other driver simply wants to arrive as quickly as possible or to traverse the shortest distance.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

The route planning systems and methods described herein enable driving directions, which are not static with respect to context and user preferences, to be provided to users. Rather, driving directions can be created that are at least partially dependent upon contextual information associated with a driver's journey, wherein the contextual information can include time of day, day of week, weather conditions, whether a day is a holiday, existence of events (such as sporting events and/or concerts in a region), and any other suitable contextual information. As is known by commuters driving through highly congested regions during rush hour, time of day and day of week can have a significant impact upon traffic flows over particular roadways. Thus, utilizing features described herein, different driving directions can be provided at different times between the same two geographic points given altering contexts. More particularly, described herein are systems and/or methods for harnessing data collected about context-sensitive routes taken by drivers and utilizing such data to generate recommendations for routes based upon the contextual information, inferred or known preferences, or combinations of preferences and contextual information.

Additionally, conventional route planning systems do not take into account detailed user preferences. For instance, drivers do not always prefer to take a route that is deemed the fastest and/or shortest between two locations. Pursuant to an example, a driver may willingly extend their journey to avoid merging at a particular location. Route planning systems/methods described herein enable drivers to be associated with one or more driving profiles, wherein such profiles may be associated with detailed driver preferences. For example, one profile may represent drivers that always wish to travel along a route that will take a least amount of time, while another profile may represent drivers that prefer to somewhat extend their journey to drive on roads deemed as being scenic. Yet another profile can represent drivers who wish to avoid busy merges onto freeways at all costs.

A user can be associated with a driving profile by monitoring their activity. For instance, if the user's automobile is associated with a GPS sensor, then such user's driving activity can be tracked over time and their driving preferences can be inferred. In another example, the user's demographics may be indicative of how he/she should be profiled. If the user is in their seventies, then they typically will be less willing to drive on fast-moving and highly congested road segments than a driver in his/her twenties. Furthermore, there may be a correlation between web sites visited, demographic information, and driving preferences. It is thus understood that any suitable data relating to a user can be collected and utilized to infer driving preferences of the user. Driving directions can then be output based at least in part upon contextual data and inferred user preferences. Thus, the route planning systems/methods described herein can provide users with driving directions that are predictive of routes that such users would have taken if they were aware of all available routes between provided geographic locations.

To enable such robust creation of driving directions, a detailed and sophisticated representation of a traffic system can be employed. Such representation can include, for example, a graph that comprises edges that are representative of road segments and nodes that are representative of intersections. The nodes and edges of the graph can then be weighted through collection and analysis of data taken from actual drivers in a traffic system. For instance, the graph can be weighted by monitoring speeds associated with drivers over particular road segments with respect to different contexts. Therefore, weights within the graph can alter as context alters, just as traffic flow over certain road segments alters as context alters. Additionally, edges and nodes within the graph can be weighted based at least in part upon detailed user preferences. Thus, for instance, two different users can request driving directions between the same two geographic regions at the same time but be provided with different driving directions.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed matter is intended to include all such aspects and their equivalents. Other advantages and novel features may become apparent from the following detailed description when considered in conjunction with the drawings.

DETAILED DESCRIPTION

Figure 1:
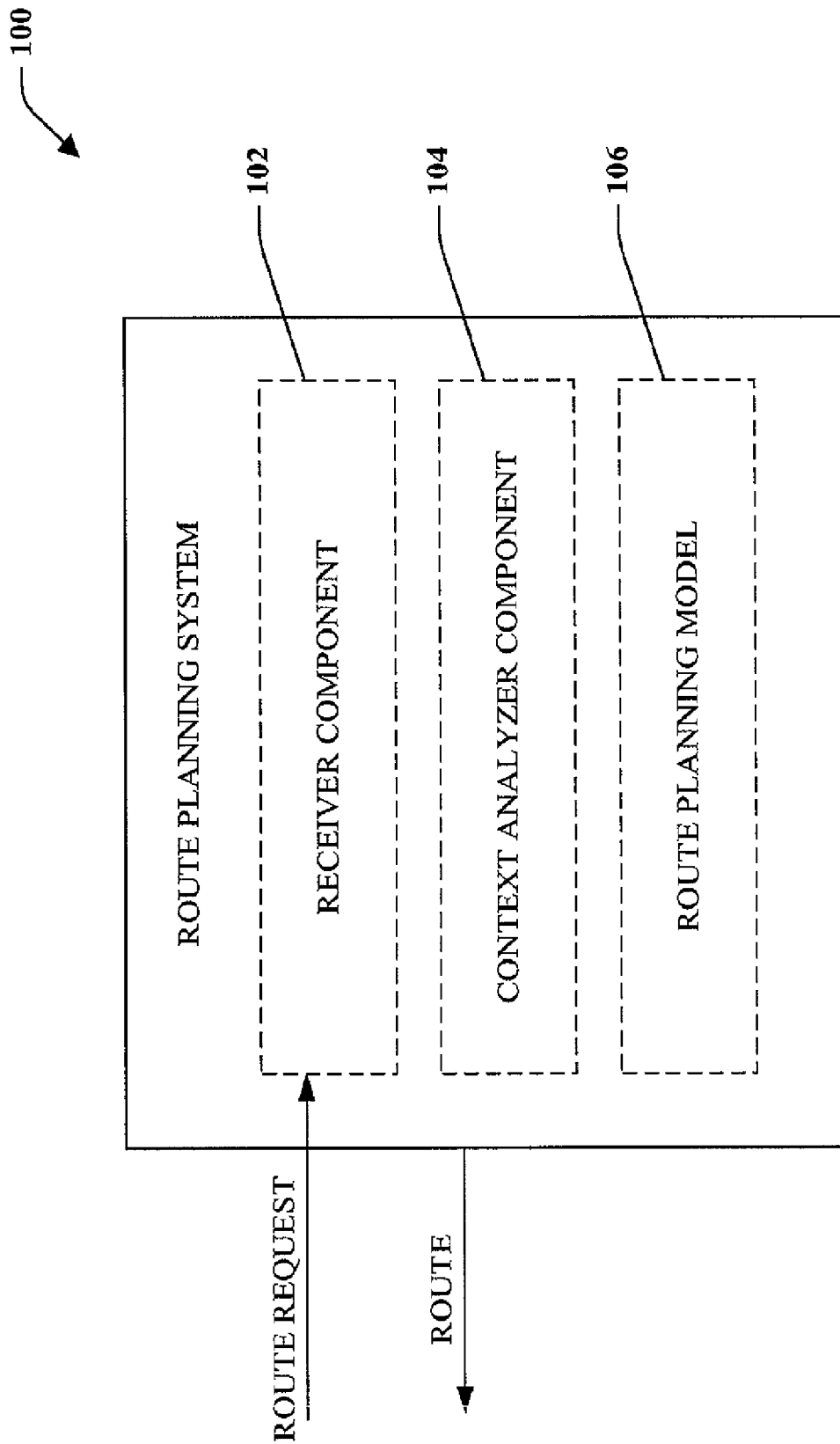
FIG. 1 is a high-level block diagram of route planning system that can create driving directions based at least in part upon contextual data.

The subject invention is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Referring now to FIG. 1, a route planning system 100 is illustrated that takes into consideration current or predicted context associated with a requested route as well as detailed driving preferences associated with a user. The system 100 can be resident upon a server that is accessible by way of a network (e.g., the Internet), can be resident within an automobile, can be retained within a client, such as within a portable device, or any other suitable location. The system 100 includes a receiver component 102 that is configured to receive a request for driving directions between a point of beginning and a destination. For example, the request can receive an initial address or location and an end address and location. Moreover, the receiver component 102 can receive and analyze textual (e.g., typed) requests, spoken requests, or any other suitable requests. Thus, the receiver component 102 can be associated with voice recognition hardware/software that enables voice commands to be received, parsed, and interpreted.

The route planning system 100 further includes a context analyzer component 104 that analyzes context associated with the received request. For instance, the context analyzer component 104 can analyze time of day associated with the request, wherein the time of day can be assumed to be a time that the receiver component 102 receives the request or a time in the future that travel will take place (e.g., provided by the initiator of the request). Additionally, the context analyzer component 104 can determine/receive contextual information such as day of a week, whether a day is a weekday or weekend, whether a day is a holiday, current or forecasted weather conditions, current status of roadways within a traffic system (e.g., whether and where an accident has occurred), and any other suitable contextual data. In contrast to conventional route planning systems, the route planning system 100 can output directions between points that are based at least in part upon current, future, predicted, and/or inferred contextual data. Thus, a route/directions output by the route planning system 100 between the same two points may vary depending upon time of day, day of week, and the like. Accordingly, the route planning system 100 is much more robust than conventional route planning systems.

Such robustness is enabled through utilization of a route planning model 106 that is based at least in part upon collected data. As will be described in more detail below, data can be collected from vehicles operated by particular drivers over time, and such information can be utilized in connection with modeling a traffic system. Further, the collected data can be analyzed in light of disparate contexts associated with when the data was collected. Additionally, profiles can be defined that are representative of particular types of drivers, and the route planning system 100 can output routes based at least in part upon a profile associated with a requesting user. For example, a particular individual may attempt to avoid busy merges on freeways, and a profile can be defined that corresponds to such driving preference. The route planning system 100 can determine a profile of an individual requesting directions through explicitly provided driving preferences and/or implicitly through monitoring actions of the individual in connection with demographics associated therewith. For example, drivers at or near retirement age may be less likely to wish to travel on busy freeways than drivers in their mid twenties. These profiles can be defined based upon analysis of data collected from drivers in a region where they are familiar with the traffic system (thus indicating how they prefer to drive). Creation of the route planning model 106 and definition of profiles is described in more detail infra.

In operation, the receiver component 102 can receive a request for a route (directions) between two provided points, which can be addresses, cities, monuments, and the like. Upon receipt of such request, the context analyzer component 104 can receive/retrieve contextual information that is associated with the request as well as user-centric information that may aid in profiling the user's driving preferences, such as demographic information, answers to a driving questionnaire, etc. The route planning model 106, which can include a graph of one or more traffic systems, can then be accessed and analyzed in light of the received request, context, and user-centric information. For example, the route planning model 106 can include a weighted graph where nodes represent intersections and edges represent at least portions of roadways. The edges can be weighted differently depending upon context and user, such that different users providing requests between the same two points at different times may be provided with different directions. It is understood, however, that the route planning model 106 can be or include any suitable model of a traffic system. The route planning system 100 can then output the determined route to the requesting user. The system 100 therefore can output directions that are predictive of the route a particular user would take if they were familiar with at least a vast majority of possible routes between a provided beginning and destination point.

With more specificity, data can be collected from drivers who are familiar with an area during different contexts (e.g., at different times of day and days of the week). Such information is then utilized by the system 100 to enable naïve drivers (or drivers unfamiliar with a particular portion of a traffic system) to leverage such information. In other words, directions can be provided to a user, wherein such directions can be reflective of a route the user would travel if they were familiar with the road system they are traveling upon. Thus, the expertise of the masses can be employed to render the system 100 more insightful with respect to assisting individuals who may not have a great deal of knowledge regarding a particular traffic system. As more data is collected with respect to a particular user (e.g., types of roads the user travels given different contexts), the data collected from other drivers can be still more useful in connection with creating driving directions for such user. Thus, subtle (inferred or explicitly provided) driver preferences can be taken into account by the system, such that two individuals who request directions between the same two points at the same instance in time may be provided different directions. For example, it can be inferred that a first user prefers not to travel over highways while a second user only cares to take the route that will cause him to traverse between two points in a least amount of time. Accordingly, the system 100 can take into account such subtle preferences when outputting routes.

Figure 2:
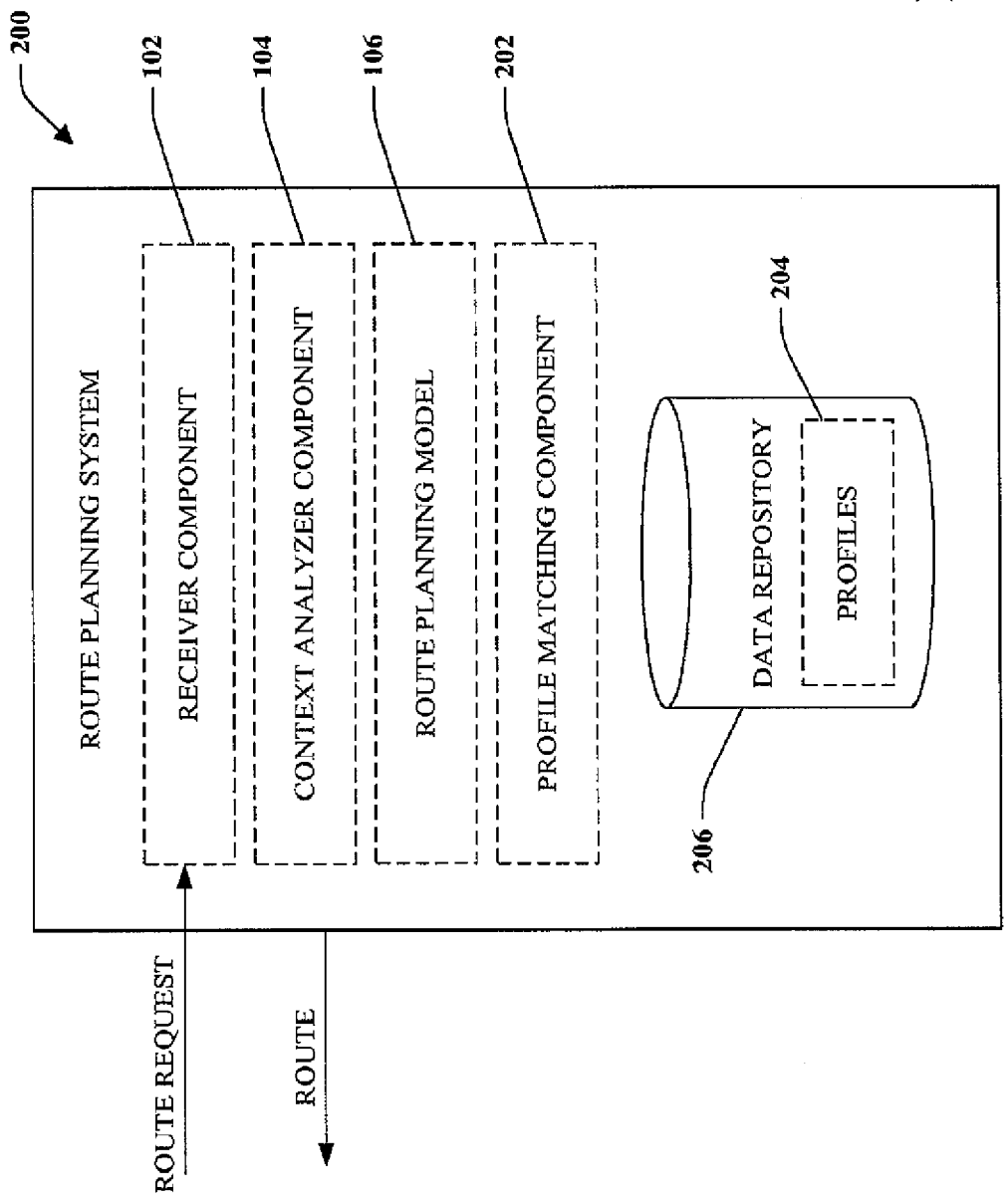
FIG. 2 is a block diagram of a route planning system that can create driving directions based at least in part upon inferred user driving preferences.

Turning now to FIG. 2, a route planning system 200 that can output directions that are based at least in part upon contextual information and detailed user preferences is illustrated. The system 200 includes the receiver component 102 that receives a request for directions between two geographic points, which can be addresses, monuments, cities, longitude/latitude points, etc. The receiver component 102 can additionally receive user-centric data that may be indicative of driving preferences. For example, the receiver component 102 can receive demographic information associated with the requesting user, wherein such information may be indicative of driving preferences of the user. Similarly, the receiver component 102 can receive a search log from the Internet, as there may be a correlation between searches and how a user prefers to drive. In a particular example, upon analyzing searches and driving habits it may be discerned that individuals searching for sports information tend to wish to take a fastest route between two points regardless of road type, while individuals searching for political news prefer scenic routes.

The system 200 additionally includes the context analyzer component 104 that analyzes context associated with the received request. For instance, as described above, the context analyzer component 104 can analyze the received request in connection with time of day, day of week, whether an event is being held within a traffic system, current and/or forecasted weather conditions, and the like. A profile matching component 202 can analyze received user-centric data and match such data to one or more profiles 204 that are resident within a data repository 206. For example, the profiles 204 can include a profile for drivers that prefer scenic routes, a profile for drivers that prefer a fastest route at all times, a profile for drivers that prefer to avoid busy freeways, a profile for drivers that prefer to avoid busy intersections and/or busy merges, and various other profiles. It is thus understood that numerous profiles of any suitable granularity can be stored within the data repository 206 and are accessible by the profile matching component 202 based upon received/stored user-centric data.

Once the request has been received, context associated with the request has been analyzed, and the requesting user has been profiled, the route planning model 106 can be accessed in connection with outputting a route that takes into consideration context associated with the request and detailed user driving preferences. As alluded to above, the route planning model 106 can include a graph that is representative of a traffic system, wherein edges and/or nodes can be weighted to enable estimation of an amount of time it will take a driver to travel over segments of roadways and/or intersections. The weights associated with the graph can vary depending upon time. For instance, driving over a particular road segment during rush hour may take much more time than driving over the same segment of road at midnight. Additionally, weights within the route planning model 106 can be altered based upon user-centric data. For instance, if the requesting user refuses to drive on busy freeways, the weight associated with a busy freeway can be weighted at or close to infinity. Once the weights have been assigned given the contextual data and an assigned profile, an algorithm (not shown) can be utilized to determine a least-weighted route between the two points provided in the received request. This route can then be provided to the requesting user (by way of, for example, a graphical user interface).

Figure 3:
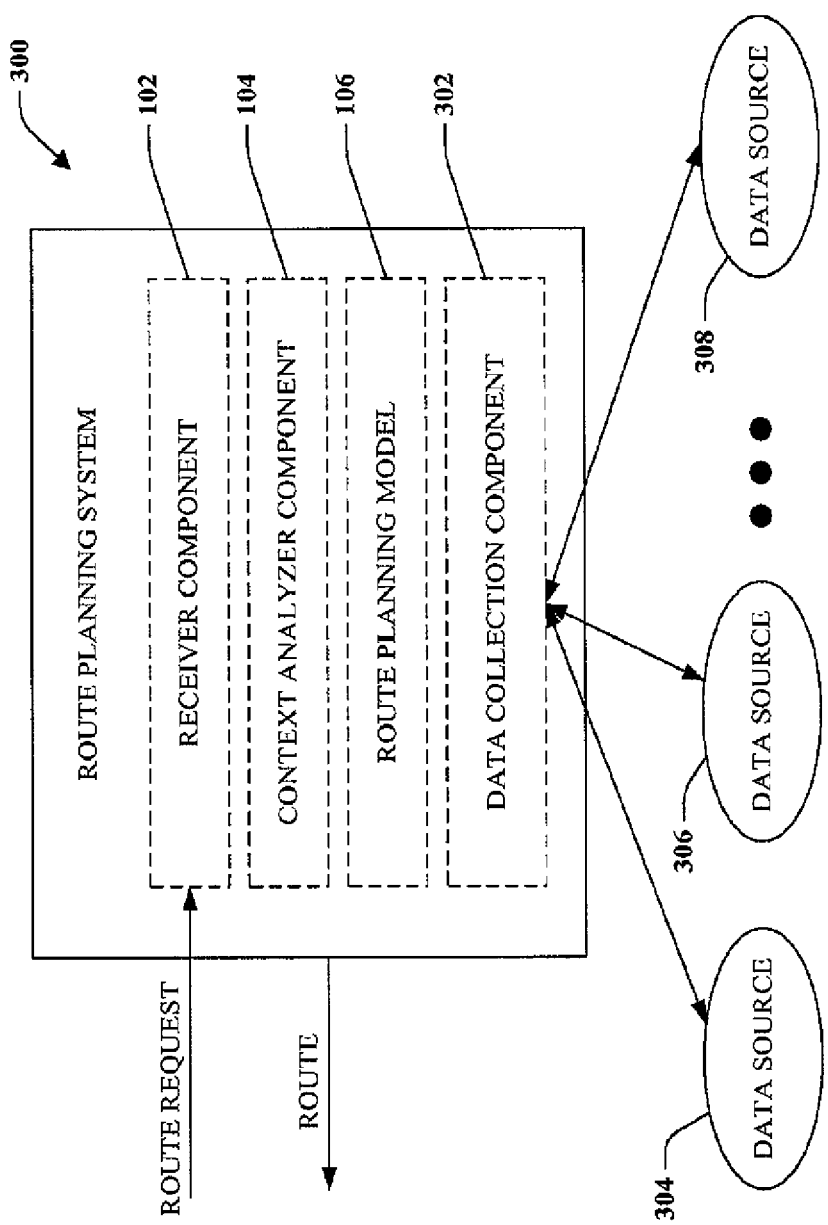
FIG. 3 is a block diagram of a route planning system that can create driving directions based at least in part upon data received from a plurality of data sources.

Referring now to FIG. 3, a route planning system 300 is illustrated. The route planning system 300 includes the receiver component 102 that receives a request for directions from a first geographic location to a second geographic location. The context analyzer component 104 determines a context associated with the request, wherein the context can include, for example, time of day, day of week, whether the day is a holiday, etc. The system 300 can additionally include a data collection component 302 that is utilized to collect detailed contextual data and/or user-centric data. For instance, the data collection component 302 can be communicatively coupled to a plurality of data sources 304-308, which can be sensors, web pages, radio programs, and the like. Pursuant to an example, the user initiating the route request can have a calendar application on a computer, and the data source 304 may be such calendar. The data collection component 302 can receive appointments from the calendar and the profile matching component 202 (FIG. 2) can utilize such data in connection with determining an appropriate profile for the user. For instance, typically the user may wish to drive over scenic routes; however, the appointment in his calendar may require that such user take a route to a destination that takes a least amount of time (when compared to other available routes).

The data sources 304-308 can be any suitable data sources. For instance, the data source 306 can be sensors associated with a roadway that indicate current traffic conditions. In another example, the data source 306 can be a website that describes current/forecast weather conditions. Still further, the data source 304 may be a radio station that announces traffic accidents, wherein the data collection component 302 can understand and interpret particular words relating to such accidents. Thus, the data collection component 302 can receive/retrieve data that is pertinent to a particular user's route and/or user preferences. The route planning model 106 can be updated according to the received data. For instance, as described above, the route planning model 106 can include a weighted graph, wherein the weights indicate cost to a user associated with particular road segments/intersections. The cost can be based at least in part upon expected time associated with traveling over road segments and/or through intersections and/or based at least in part upon user driving preferences. Once updated, the route planning model 106 can be employed to output a route/directions to a user that takes into consideration contextual data and detailed user driving preferences.

Figure 4:
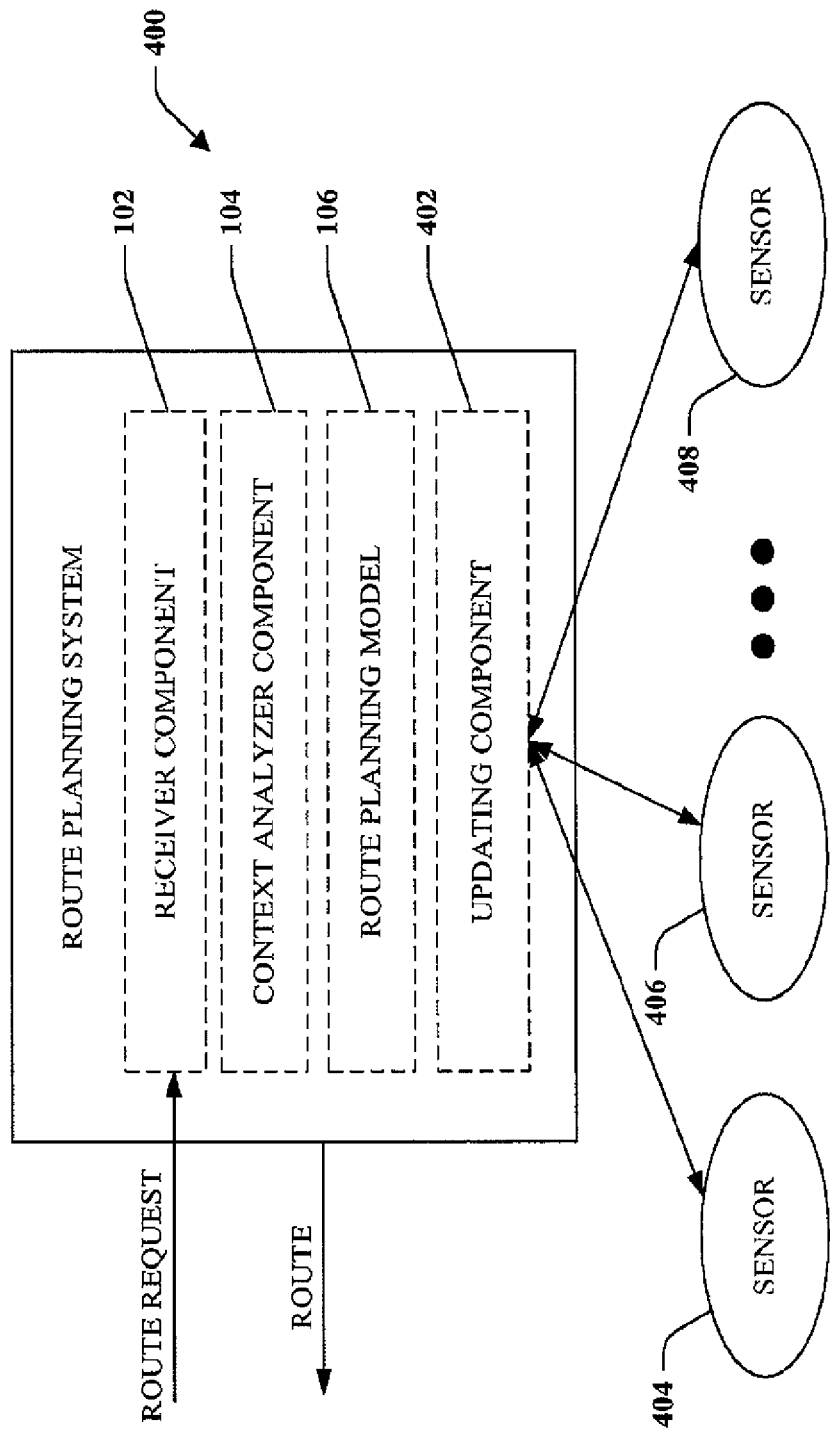
FIG. 4 is a block diagram of a route planning system that can be updated as road conditions alter.

Referring now to FIG. 4, a route planning system 400 that outputs directions between two geographic locations based at least in part upon contextual data and user driving preferences is illustrated. The route planning system 400 includes the receiver component 102, the context analyzer component 104, and the route planning model 106, which can act in conjunction as described above. The system 400 can additionally include an updating component 402 that is employed to update the route planning model 104 as traffic systems alter. For instance, traffic systems are not static; rather, they are subject to significant change over time. Pursuant to an example, construction on a freeway can cause a typically free-flowing road segment to be associated with significant and long-lasting bottlenecks. Similarly, a two lane road that is altered to a four lane road may cause traffic to flow more smoothly. Still further, continued road degradation may make it undesirable to travel upon a particular segment of roadway. The updating component 402 can be employed to update the route planning system 400 as conditions associated with roadways alter.

Pursuant to an example, the updating component 402 can be communicatively coupled to a plurality of sensors 404-408, which can be, for example, GPS sensors associated with automobiles, a device that can determine location/rate of speed of a user by using triangulation in connection with a mobile communications device (such as a cellular telephone), and the like. Data from such sensors 404-408 can be analyzed by the updating component 402, which can in turn update the route planning model 106 based at least in part upon the analysis. For instance, if the route planning model 106 includes a weighted graph, the updating component 402 can update the weights as conditions within a traffic system modeled by the route planning model 106 alter. Therefore, if in actuality a road segment becomes associated with greater amounts of traffic, such change in traffic will be reflected within the route planning model 106. Additionally, the updating component 402 can be utilized to update the route planning model 106 with newly added streets, take into consideration newly erected stop signs or newly functioning stop lights, etc. Therefore, the route planning model 106 can accurately reflect real-world alterations to a traffic system. The route planning system 400 can thus continue to output directions/routes to users that reflect current traffic conditions.

Figure 5:
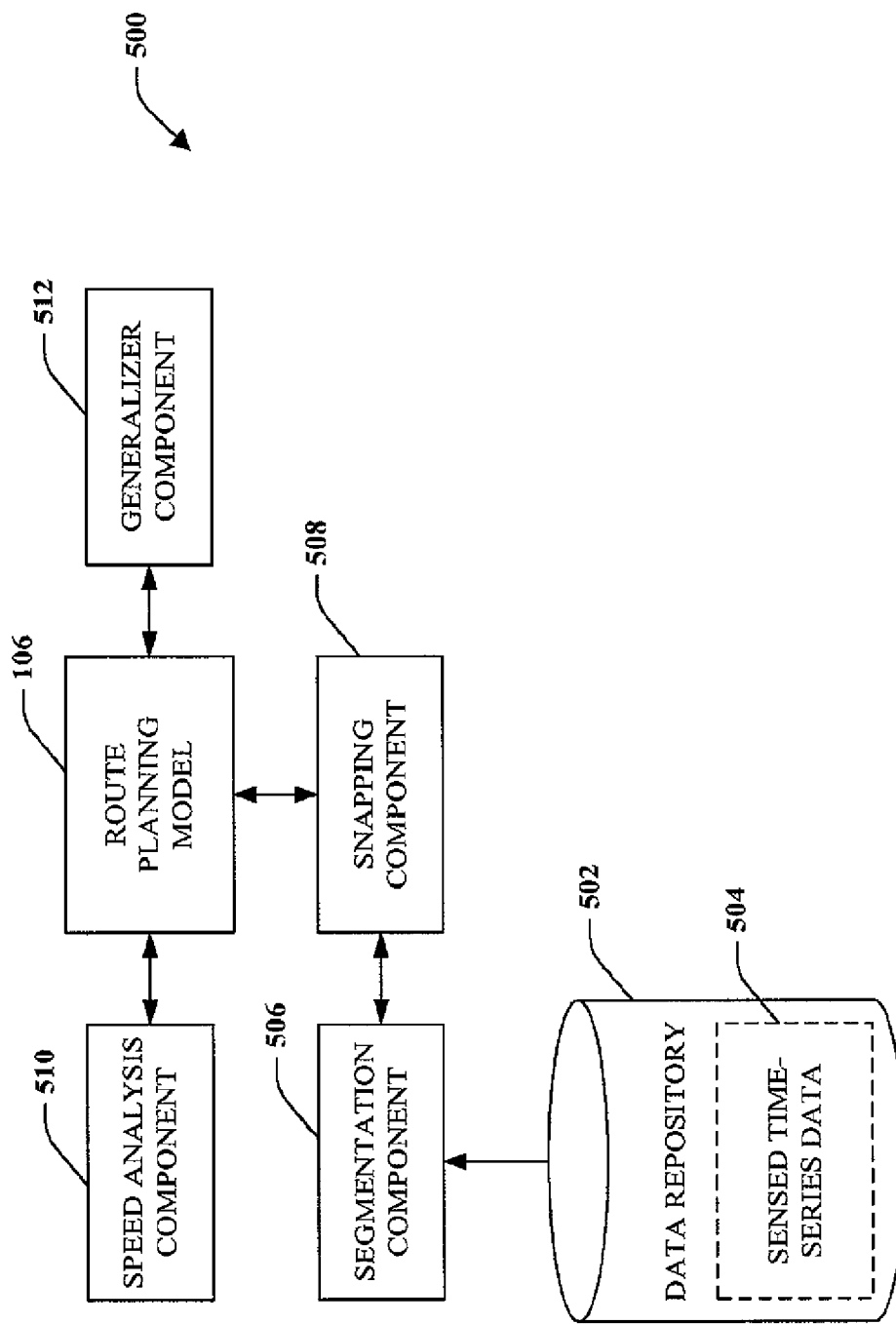
FIG. 5 is a block diagram of a system that can be utilized to create a context-dependent representation of a traffic system.

Referring now to FIG. 5, a system 500 for building the route planning model 106 is illustrated. The system 500 includes a data repository 502 that includes sensed time-series data 504, wherein such data can be collected from a plurality of drivers as they travel through a traffic system. For example, the sensed time-series data 504 can be obtained by associating location-determining sensors (such as GPS receivers) with a plurality of drivers in a traffic system (e.g., a metropolitan traffic system). As data is generated from the sensors, such data can be associated with time-stamps. Thus, trace logs for each respective driver associated with the location-determining sensor(s) are generated and can be placed within the sensed time-series data 504. Additionally, the sensors can be configured to record/output data only when a vehicle is in motion, and can automatically cease recording/outputting after the vehicle is immobile for a threshold time and/or when the vehicle is shut off. The sensors can again record/generate data when the vehicle associated therewith begins to travel. A segmentation component 506 can be employed to discern when individual journeys stop and start. As sensors associated with automobiles stop recording when the automobiles stop moving for a threshold amount of time, most (but not all) individual journeys taken by the drivers can be identified by the segmentation component 506 through reviewing time gaps that appear in the sensor logs.

Some situations exist, however, where it may not be easy to discern where a journey started and stopped. For example, a driver may stop for a short period of time to drop off a passenger. To locate such situations, for example, the segmentation component 506 can analyze logs within the sensed time-series data to determine when a loop has been made (e.g., from location A to location B to location A). If the segmentation component 506 detects a loop, then a segmentation point can be chosen at a point in the loop that is physically furthest from where the loop closes.

As described above, the route planning model 106 can include a graph, where nodes in the graph represent intersection of roads and edges are roads themselves. A single road may be represented by multiple edges, as each road segment (the smallest unbroken portion of a road between two intersections) can be a separate edge in the graph. Additionally, the edges and nodes can be associated with latitudes and longitudes of roads that they represent. Once the sensed time-series data 504 has been segmented into individual journeys, such journeys can be "snapped" to the graph within the route planning model 106. This may be problematic in that, for example, noise can be associated with GPS signals. Additionally, the graph may be imperfect; for instance, two different maps may pinpoint a particular latitude/longitude position at slightly different locations relative to surrounding features in each representation. Thus, the sensed time-series data 504 when mapped to the route planning model 106 may not fit perfectly.

A snapping component 508 can be employed to "snap" each collected data point to an appropriate location represented within the route planning model 106. For instance, the snapping component 508 can snap each collected data point to an on-road location nearest to it, and trace logs can be reconstructed by connecting the on-road locations together by way of the shortest on-road paths between each consecutive pair. In another example, the snapping component 508 can employ a Hidden Markov Model in connection with snapping trace logs to a graph within the route planning model 106. Informally, the Hidden Markov Model can consider potential snaps for each raw piece of collected data $o_i$, and can select a best on-road snap $s_i$ for each such that a resulting sequence of on-road locations is as smooth as possible while maintaining proximity between the raw data and respective snapped locations. The set of possible snap locations for a single raw piece of sensed data (e.g., GPS point) $o_i$ is created by collecting, for each road segment within a threshold distance of $o_i$, a location $s_i$ for each road segment that is most proximate to $o_i$. Several candidate $s_i$ locations can result where a road network is dense while fewer result in areas of sparse road coverage.

Formally, the Hidden Markov Model that can be employed by the snapping component 508 can define the following joint probability over sequences of raw and snapped sensed locations (O and S, respectively), from which a maximum-probability sequence of snapped locations for a particular trace log can be deduced using the standard Viterbi algorithm:

$$P(S, O) = \prod_j P(o_i \mid s_i) P(s_j \mid s_{i-1})$$

The first term in the product is the observation probability: how likely would the observation $o_i$ have been if, for example, the GPS receiver had actually been at on-road location $s_i$? This probability can be given by error characteristics of GPS receivers, for example, modeled as a zero-mean Gaussian with a standard deviation of a particular distance (e.g., 10 meters). The second term in the product is the transition probability: how likely would the on-road location $s_i$ have been if the sensing device was known to be at location $s_{i-1}$ when the previous measurement was recorded? This can be defined as the fraction a/b, where a is the straight-line distance from $s_{i-1}$ to $s_i$ and b is the length of the shortest on-road path between the same. Such a definition may penalize transitions that round corners, emphasizing the idea that turns are relatively rare during travel. The false "penalty" incurred by two consecutive points on a curved road is negligible because location data can be collected at relatively high frequency (e.g., every six seconds or less). Additionally, transitions between distant snap locations can be penalized, since generally there is no on-road, straight-line path between them. It can be noted that a/b<1, and the snapping component 508 can normalize such that transition probabilities emanating from each node of the Hidden Markov Model sum to one.

In another example, the snapping component 508 can use an alternative definition for the transition probability. Namely, a value can be assigned with magnitude that is inversely proportional to the number of "hops" (road segment transitions) in the transition. In this case, a pair of points for which the shortest on-road connecting path includes three road segments will have a lower probability than a pair of points on the same segment. Another alternative for transition probability is to use a single, fixed probability for transitions between points on the same road and separate, lower probability transitions for different roads. Defining such probabilities, however, can be a difficult task: a large ratio between two probabilities may result in on-road routes that remain on a single road to the point of ignoring collected data, while a small ratio may place too much emphasis on potentially noisy readings.

Once the trace logs are mapped into road segments, a speed analysis component 510 can associate different weights to edges/nodes within the graph of the route planning model 106 over different times. For example, the speed analysis component 510 can learn time-dependent traffic speed for roads by breaking days of the week into multiple categories and breaking such categories into several time slices. For purposes of illustration, it can be assumed that the speed analysis component 510 breaks the days of the week into two categories: weekdays and weekends. Such categories can then be broken into 96 time slices; 15-minute blocks of time covering 24 hours of the day. It is understood, however, that the speed analysis component 510 can create categories associated with any sort of contextual data. For instance, the speed analysis component 510 can create categories based upon weather conditions, holidays, and the like.

Continuing with the above example, the speed analysis component 510 can learn a separate average speed for each time-of-day and weekday/weekend breakdown by examining each pair (A, B) of consecutive GPS points in snapped traces. The average speed of a driver between each pair can be calculated, and the speed can be utilized to create a running average for every road segment traversed to get from A to B. Speed measurement can be applied to the running average associated with a block of time whose time characteristics match those of timestamps of collected data involved in the speed calculation. Thus, the speed analysis component 510 can determine speeds associated with road segments in various categories (time of day, day of week, . . . ). The speed analysis component 510 can then associated such data with the route planning model 106, such that edges and nodes are weighted based upon the collected data.

It can be discerned, however, that it may be impossible to obtain data for every road in a traffic system over every category. Thus, road speeds can be generalized given known road speeds of "similar" road segments. In more detail, a generalizer component 512 can analyze the route planning model 106 and provide speed values to road segments that are not associated with collected data for each category. For instance, for road segments and time segments where no data is available, the generalizer component 512 can assign the speed that is associated with the same road segment at an adjacent time block. If there is no speed associated with an adjacent time block, the generalizer component 512 can assign the segment a speed from a similar road and/or a system-wide average of speeds from similar roads, where similarity can be defined by road class within the route planning model 106. Additionally, similarity can be determined by analyzing speed limits, geographic proximity of road segments, geographic location of road segments, and the like. Still further, if similar roads cannot be located and/or if a system-wide speed average is unavailable, the speed for a time segment can be defined as the posted speed limit.

Figure 6:
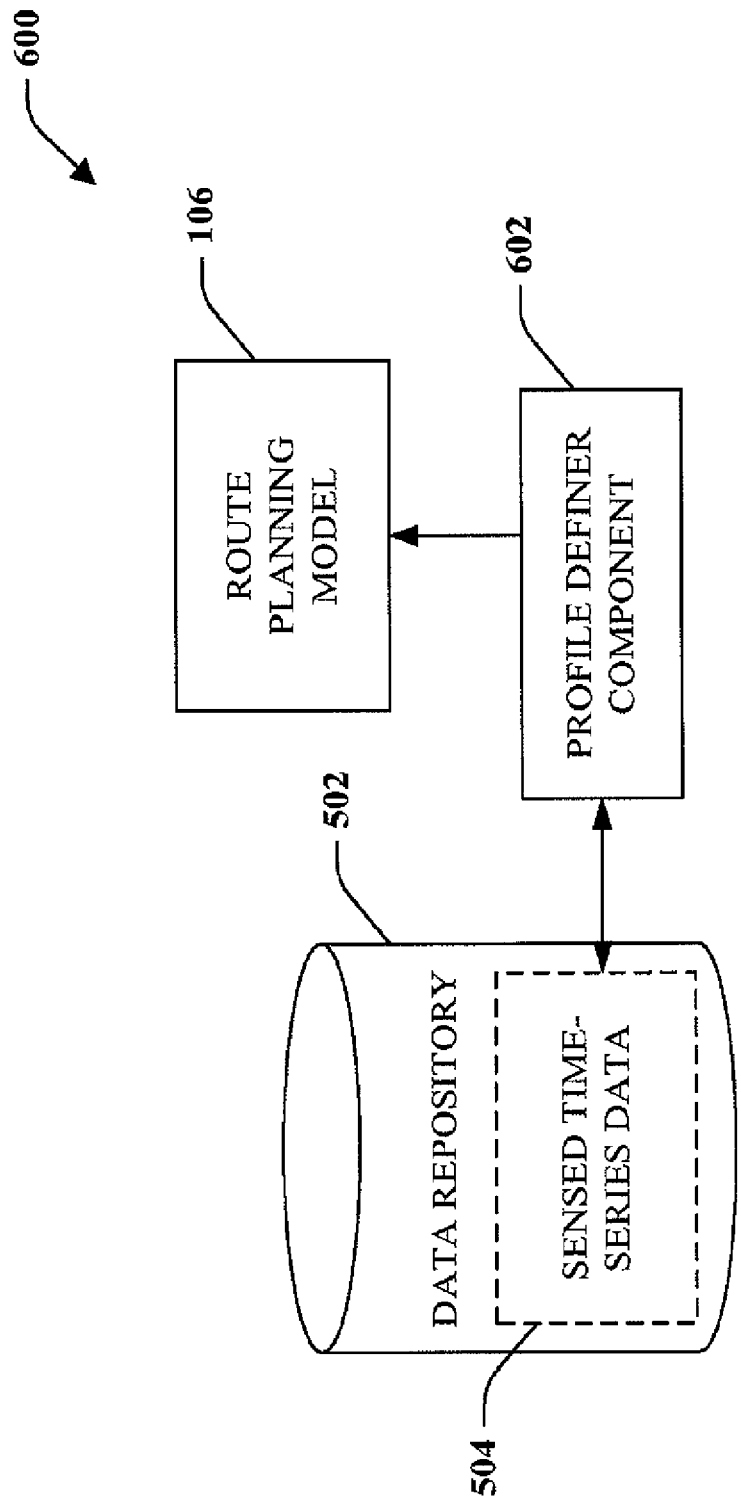
FIG. 6 is a block diagram of a system that can be utilized to create a user-driving preference dependent representation of a traffic system.

Referring now to FIG. 6, a system 600 that facilitates updating the route planning model 106 to take into account detailed user preferences is illustrated. The route planning model 106 as described above can produce routes that are, in expectation, faster to traverse, as road speeds are based upon collected data. Nevertheless, drivers are not always or necessarily concerned only with speed; their utility functions involve other variables. The system 600 enables such variables to be accounted for to personalize proposed routes to maximize implicit utilities of each driver. To provide such robustness in the route planning model 106, a profile definer component 602 can identify implicit preferences of users. To that end, the profile definer component 602 can treat each journey in a driver's trace log as a preference statement. In particular, the profile definer component 602 can assume that the route actually taken by a driver is preferred by that driver over any other route that he could have taken between same endpoints. For instance, if drivers associated with sensed data are familiar with the region, this assumption will typically hold true.

In one particular example, the profile definer component 602 can examine each trace within the sensed time-series data 504 and calculate an inefficiency ratio r, which can be defined as a ratio of the duration of a fastest route (in expectation) between the trace's endpoints (as determined through use of the segmentation component 506 and the route planning model 106, for example) and actual duration of the user's trip. Thus, the value of r will be between zero and one. In a rare instance that the driver's actual time was shorter than the expected time, the value for r can be capped at one. The meaning of r can most easily be understood in terms of its inverse, which is a value between one and infinity and represents a portion of time by which a driver has extended his/her journey beyond the shortest possible time in order to satisfy preferences unrelated to efficiency.

For each driver, the profile definer component 602 can calculate a personal inefficiency parameter $\bar{r}$ by averaging individual r values computed from each of the driver's traces. Like the r values, $\bar{r}$ will reside between zero and one. A value of one indicates that the driver typically takes the most efficient route, while lower values imply a higher willingness to sacrifice efficiency for other preferences. The profile definer component 602 can utilize $\bar{r}$ in the following utility function defining the driver-specific cost of traversing a particular road segment i:

$$c_i = \begin{cases} \bar{r} t_i & \text{if } i \text{ previously traversed} \\ t_i & \text{if } i \text{ not previously traversed,} \end{cases}$$

where $t_i$ is an estimated time required to traverse segment i (dependent upon the time of traversal). The result is that a path using only non-traversed (non-preferred) edges and requiring x seconds to traverse is equivalent in cost to a path using only preferred (previously traversed) edges and requiring $$\frac{1}{\bar{r}} x$$

seconds to traverse, since the discount of $\bar{r}$ to the latter path will result in a cost of $$\tilde{r}\left(\frac{1}{\tilde{r}}\right)x = x.$$

This equivalence is consistent with the assumption that the user is willing to extend the duration of his/her trip by up to a factor of $$\frac{1}{\tilde{r}}$$

in order to satisfy preferences not related to efficiency. The cost function also reflects interpretation of driver histories as statements of preference by allowing the profile definer component 602 to reduce cost of previously used (preferred) edges.

The profile definer component 602 generates profiles through utilizing two major assumptions: 1) drivers associated with the sensed time-series data 504 are making informed choices and are not extending duration of journeys out of ignorance; and 2) drivers prefer roads they have previously taken. The profile definer component 602 can thus weight roads given the individuals preferences. These individuals can then be a base to employ in defining profiles for other users of a route planning system. For instance, drivers with preferences similar to those of a tracked driver can be assigned a profile associated with the tracked driver. Any suitable manner for creating a profile that can be mapped to members of the general public through utilization of the profile definer component 602.

Figure 7:
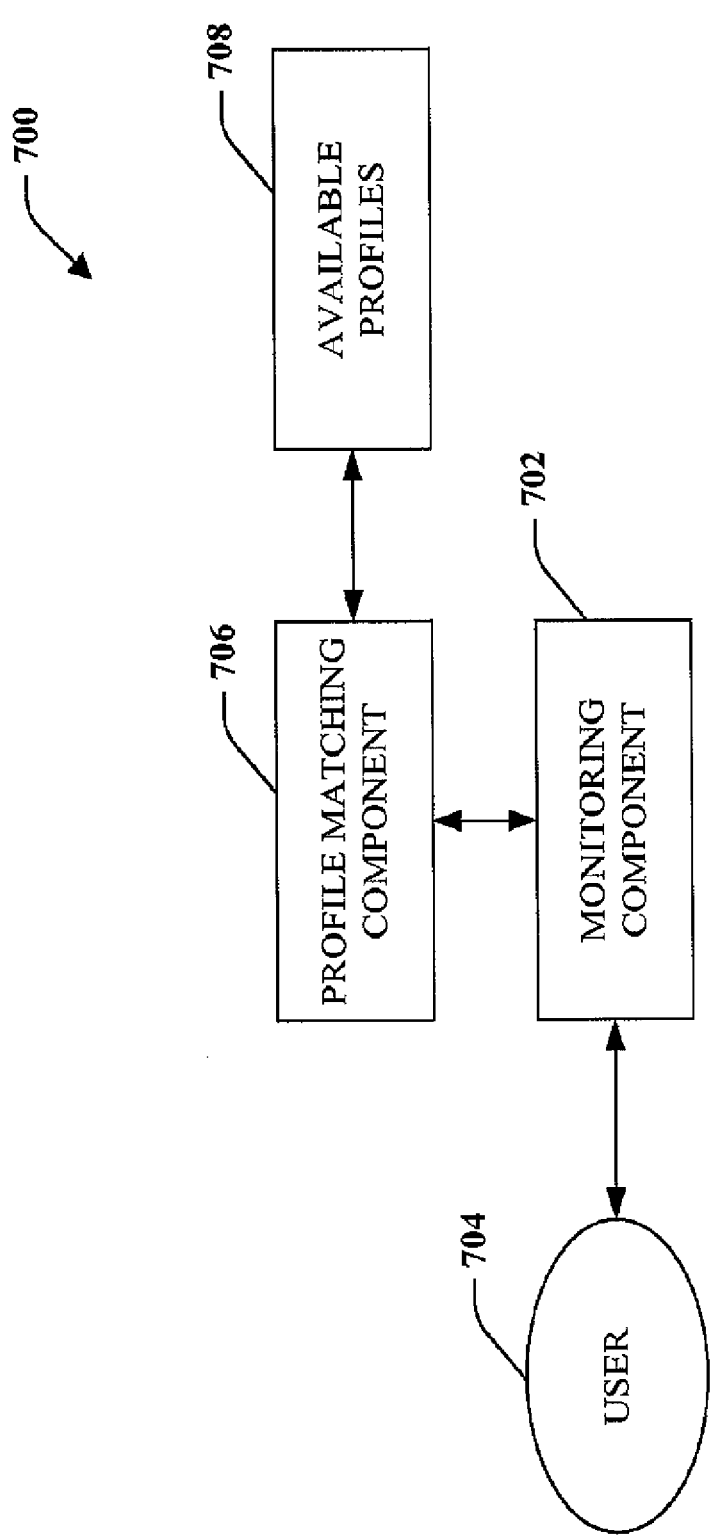
FIG. 7 is a block diagram of a system that can be utilized to assign a driving profile to a user.

Referring now to FIG. 7, a system 700 that enables a user to be mapped to a particular profile is illustrated, wherein the profile can cause weights associated with the route planning model 106 to be altered. The system 700 includes a monitoring component 702 that can monitor a user 704 over time, wherein the monitoring can include monitoring driving habits, monitoring Internet usage to determine or infer demographic information relating to the user, and the like. Monitored data can then be provided to a profile matching component 706 that is utilized to analyze the monitored data to map the user 704 to one or more available profiles 708. For example, as described above, drivers utilized in connection with creating a route planning system can be associated with personal preferences. A profile can be generated that is representative of such individuals, and later users of the system can be mapped to such profiles.

Referring now to FIGS. 8-11, methodologies in accordance with the claimed subject matter will now be described by way of a series of acts. It is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
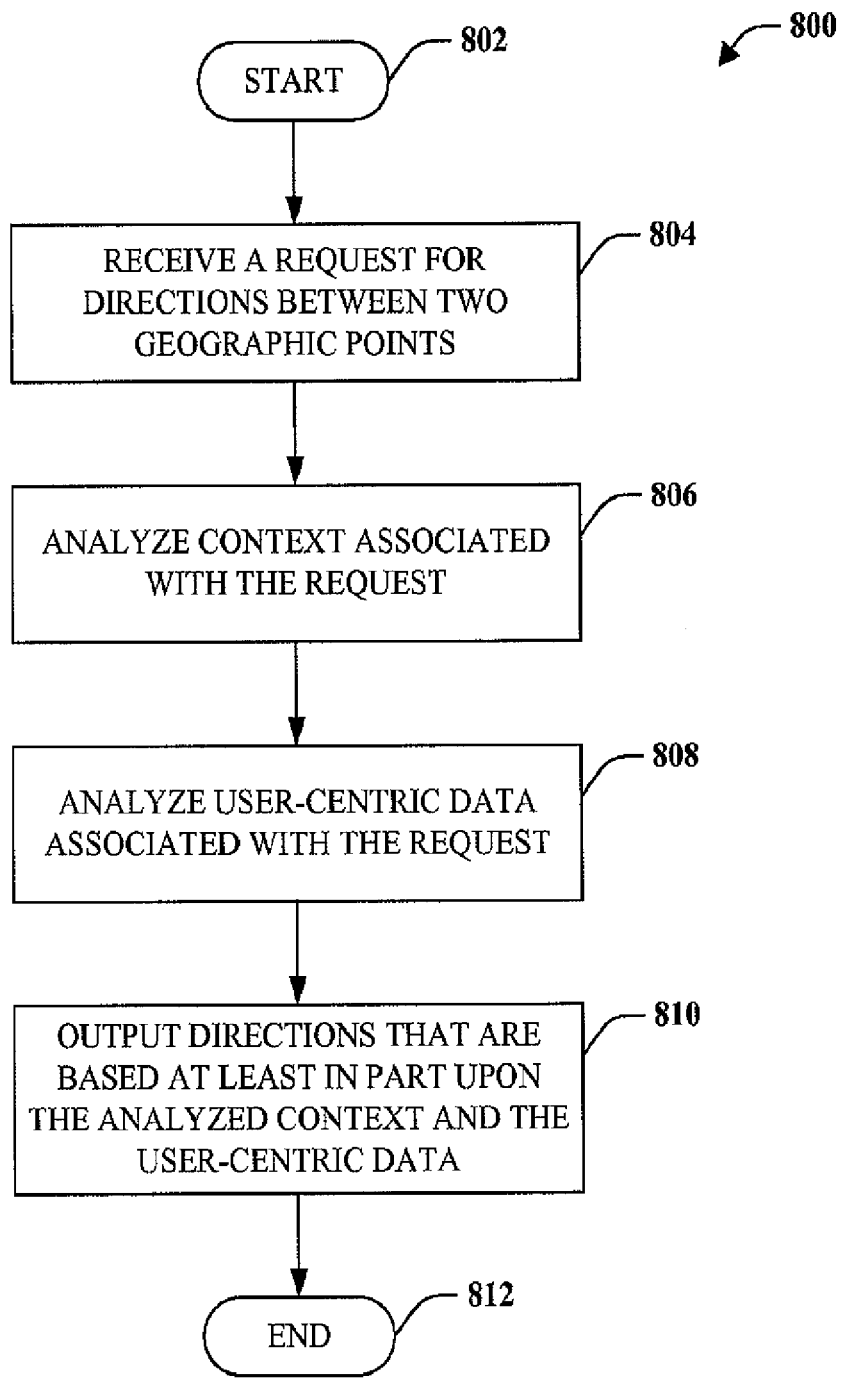
FIG. 8 is a representative flow diagram of a methodology for creating driving directions that can vary as context changes.

Referring specifically to FIG. 8, a methodology 800 for outputting directions to a user is illustrated, wherein such directions are predictive of a route that the user would take between points if the user were aware of all available routes between the points. The methodology 800 starts at 802, and at 804 a request for directions between two geographic points is received. For example, the points can be a beginning and ending address, beginning and ending cities, or any other suitable geographic points. At 806, a context associated with the request is analyzed. For instance, if the user indicates that they will be beginning a journey immediately after receiving directions, current context can be analyzed, including current day of the week, current time of day, current weather conditions, and the like. In another example, in the request the user can indicate which day of the week they will be traveling as well as what time they will be traveling. In such a case, a future context can be analyzed, including future day of week, future time of day, predicted weather conditions, etc.

At 808, user-centric data is analyzed. For instance, information indicative of driving preferences can be gleaned based upon the request and/or previously collected data. Pursuant to a particular example, generalizations can be made relating to driving preferences based at least in part upon age and sex of a driver. Specifically, older drivers are less likely to wish to travel through areas of high traffic congestion, and are willing to extend their journey with respect to time to avoid such high-congestion areas. In another example, GPS or other location-related data may be associated with a driver's vehicle, and such information can be received along with a request and/or accessed from a data repository. It is thus understood that any suitable data that may be indicative of driving preferences of the user providing the request can be received and analyzed. At 810, directions are output that are based at least in part upon the analyzed context and the user-centric data. The use of contextual data and user preferences provides significant improvements over conventional systems. For instance, a road segment may be congested at rush hour on weekdays but essentially free of traffic outside of rush hour and/or on weekends. Conventional route planning systems output same routes regardless of time of day, day of week, weather conditions, and the like. The methodology 800 completes at 812.

Figure 9:
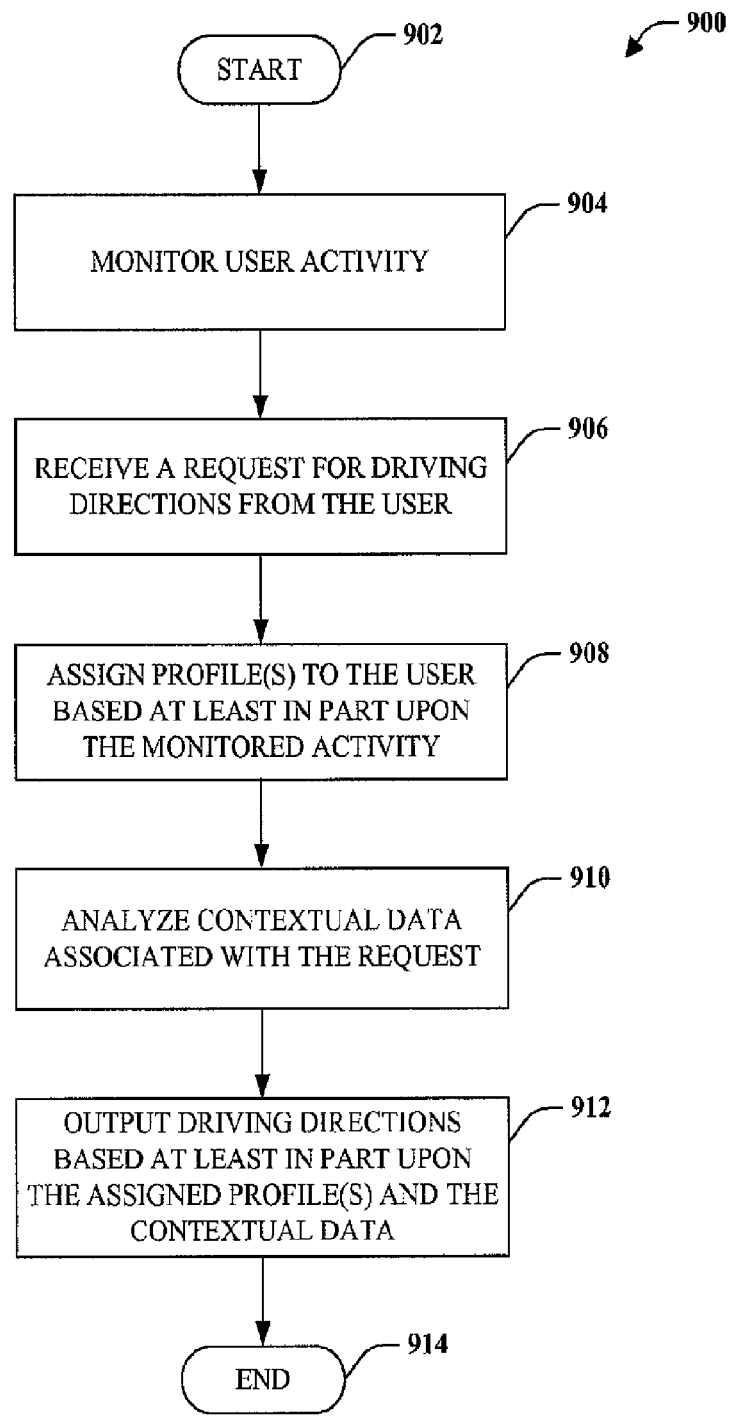
FIG. 9 is a representative flow diagram of a methodology for creating driving directions that are based at least in part upon inferred driving preferences of a user.

Now referring to FIG. 9, a methodology 900 for outputting driving directions based upon detailed/inferred user preferences is illustrated. The methodology 900 starts at 902, and at 904 user activity is monitored. The monitoring can include monitoring information that can be indicative of demographic information, such as types of websites, location of the user, home address of the user, etc. Additionally, the monitoring may include mileage on a car, miles driven per week, and the like, as miles driven may indicate a driver's comfort on freeways or high-congested areas. Still further, calendar information can be monitored to determine how quickly a user must travel between locations. It is thus understood that the monitoring of act 904 can be undertaken to receive/analyze any suitable data that may be indicative of driving preferences.

At 906, a request for driving directions is received from the user, wherein the request includes parameters that describe a journey desirably taken by the user (e.g., beginning and end point, time and data that the journey will occur, . . . ). At 908, one or more profiles are assigned to the user based at least in part upon the monitored user activity. For instance, numerous profiles can be defined wherein at least one of the profiles generally represents preferences associated with each user. At 910, contextual data that is associated with the request is analyzed, such as time of day that travel will occur, day of week that travel will occur, etc. At 912, driving directions are created/output based at least in part upon the assigned profile(s) and the contextual data associated with the request. This enables driving directions to be output that vary with different contexts and are tailored to user preferences; in other words, the driving directions are predictive of a route that the user would take given a certain context if the user were aware of all available routes between the points. After the driving directions are output, the methodology 900 completes at 914.

Figure 10:
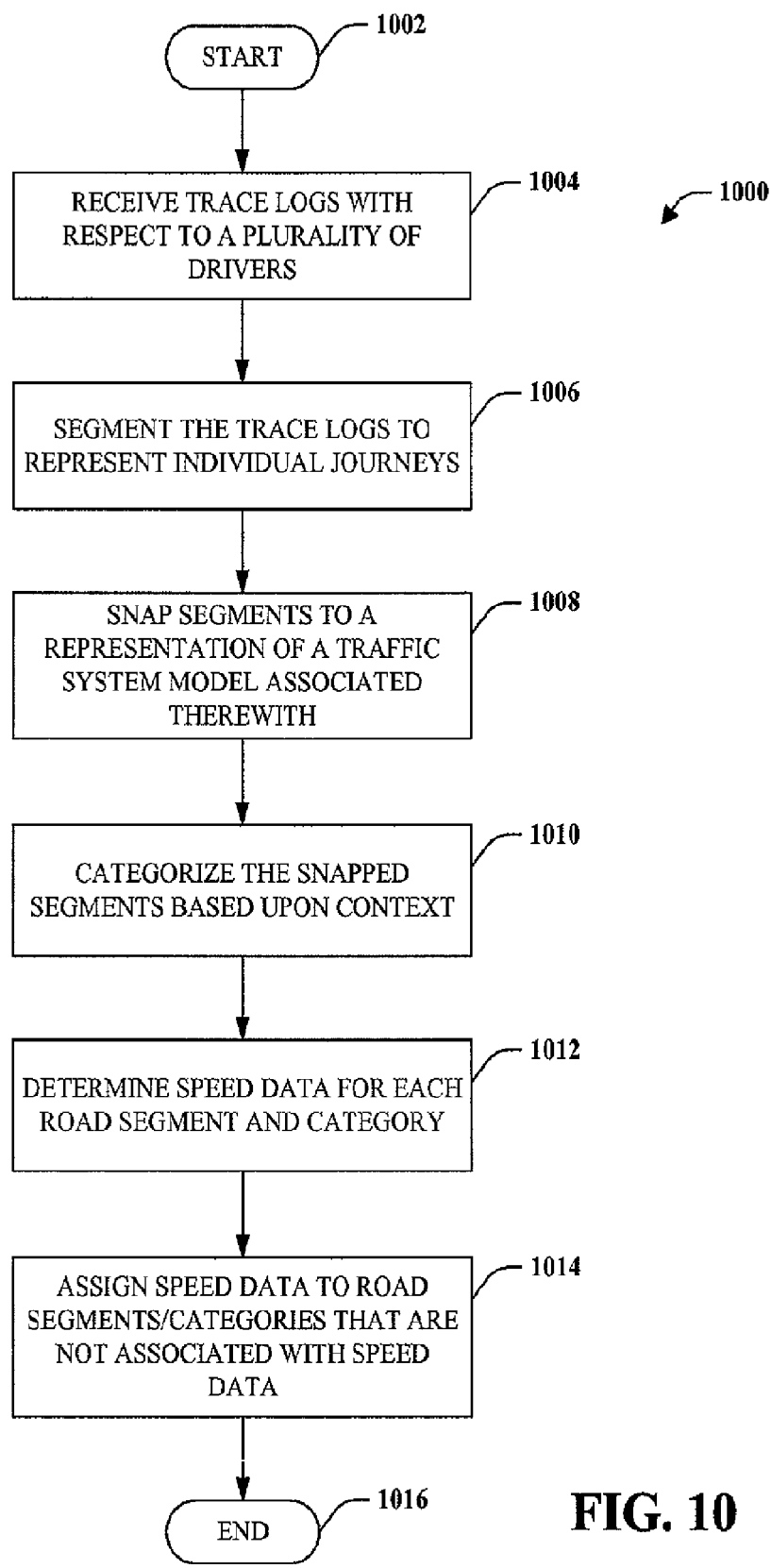
FIG. 10 is a representative flow diagram of a methodology for creating a context-dependent representation of a traffic system.

Turning now to FIG. 10, a methodology 1000 for defining parameters associated with a route planning model is illustrated. The methodology 1000 starts at 1002, and at 1004 trace logs with respect to a plurality of drivers are received. For instance, automobiles driven by the plurality of drivers can be equipped with GPS receivers (or other suitable location-tracking equipment), which can be configured to create/output location data while the automobile is running and/or moving and cease creating/outputting location data after the automobile has been at a standstill for a particular period of time. Collected data associated with each driver can be referred to as a trace log, as it is a log of their driving activities over a particular period of time.

At 1006, the trace logs are segmented so that each segment is representative of a journey undertaken by the driver. As described above, in most instances large time gaps may be indicative of a journey (as sensors cease creating/outputting data when the vehicle is not moving). Thus, the trace logs can be segmented based at least in part upon large time gaps within the trace logs. The trace logs can also be segmented by noting where a driver made a loop (e.g., started and stopped at a same location). In these instances, the trace log can be segmented with respect to the geographic point furthest from where the loop closes. At 1008, the resulting segments of the trace logs (that represent individual journeys by a driver) can be snapped to a representation of a traffic system model associated therewith. Thus, data points from the trace logs can be snapped to road segments that correspond to the data points. For example, a Hidden Markov Model can be employed in connection with such snapping.

At 1010, the snapped segments are categorized based upon context. For instance, the snapped segments can be associated with day of a week, time of day, weather conditions when the data was collected, whether a sporting event was undertaken when the data was collected, and any other suitable number of categories. At 1012, average speeds for road segments that are associated with the snapped segments are determined for each category. A road segment can be defined as a portion of road between intersections. Thus, different average road speeds for a same road segment can be calculated for different times of day, days of week, weather conditions, events, etc. At 1014, average speeds are assigned to road segments and/or categories where it is not possible to calculate average road speeds using collected data. For instance, data may not be received with respect to a particular segment of road at 3:00 a.m. Thus, the average speeds can be assigned by analyzing similar roads and assigning similar speeds based upon the analysis. In one particular example, a road segment can be assigned similar speeds that are assigned to the same road segment with respect to different categories. Posted speed limits can also be utilized in connection with assigning average speeds to road segments with respect to certain categories. Once average speeds have been assigned to road segments within the traffic system, a robust, context-sensitive model of the traffic system can be created. The methodology 1000 then completes at 1016.

Figure 11:
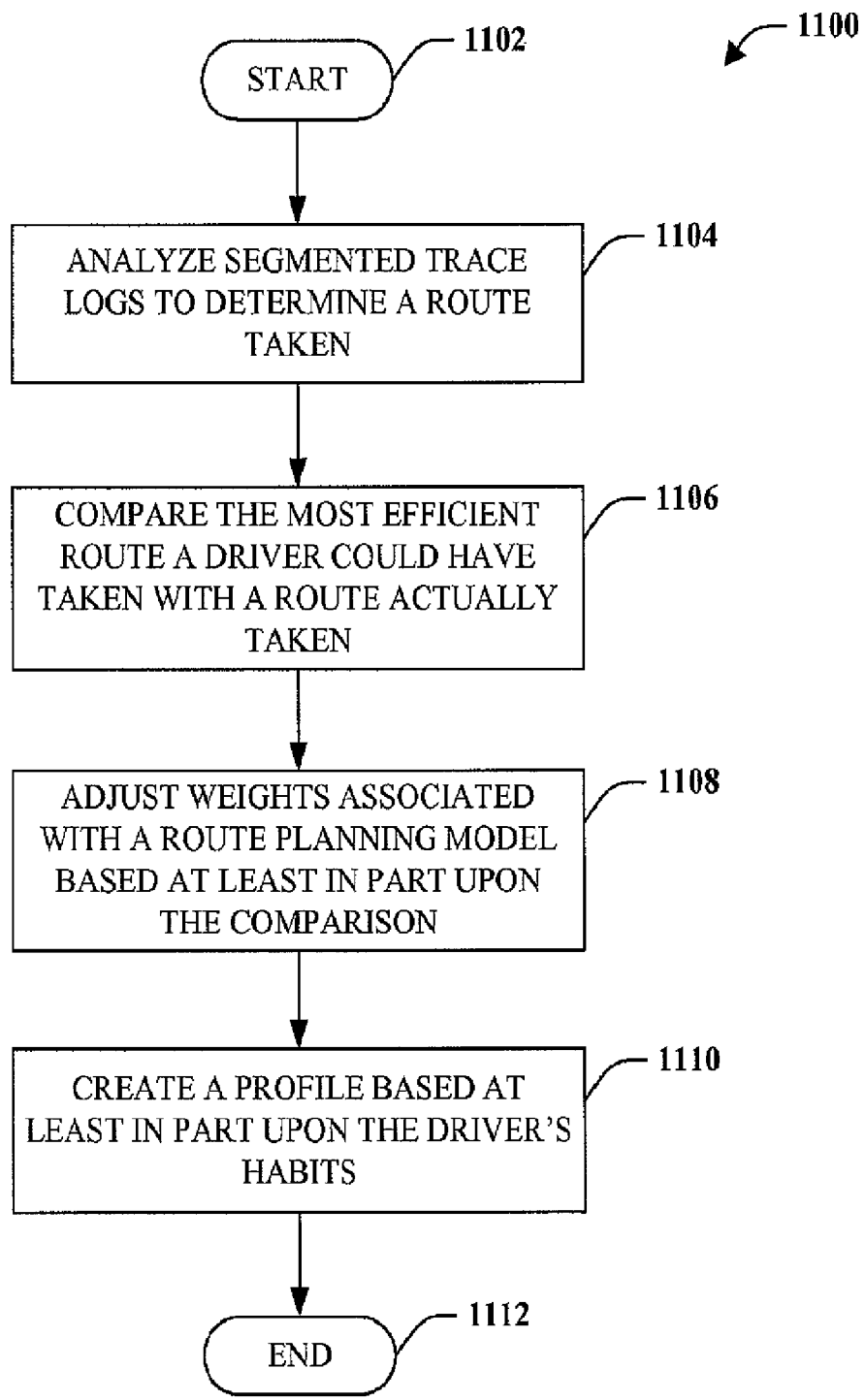
FIG. 11 is a representative flow diagram of a methodology for defining user profiles.

Now turning to FIG. 11, a methodology 1100 for creating a profile that is reflective of one or more drivers' preferences is illustrated. The methodology 1100 starts at 1102, and at 1104 segmented trace logs are analyzed to determine which route a user employed to travel between two geographic points. As described above, segmented trace logs indicate a journey taken by a driver, including a beginning point and an endpoint. At 1106, a comparison is made with respect to the most efficient route a driver could have taken (given contextual information when the driver traveled along the route) and the route the driver actually undertook. Therefore, assuming that the driver was aware of alternate routes, traveling a route that is not the most efficient route is indicative of driving preferences associated with the driver. Over time, continued analysis and comparison of routes taken by the driver and most efficient routes can enable profiling of one or more drivers. For instance, if most efficient routes involve traveling over busy merges and the driver consistently takes less efficient routes by avoiding the merges, it can be determined that the driver prefers not to travel over any busy merges. At 1108, weights associated with a route planning model can be adjusted to reflect driver preferences based at least in part upon the comparison. Thereafter, if the driver requests a route, a greater probability exists that the route provided will match the driver's preferred route. At 1110, a profile is created based at least in part upon the driver's preferences. Thus, other drivers not directly related to the driver utilized to create the profile can be assigned such profile. The methodology 1100 then completes at 1112.

Figure 12:
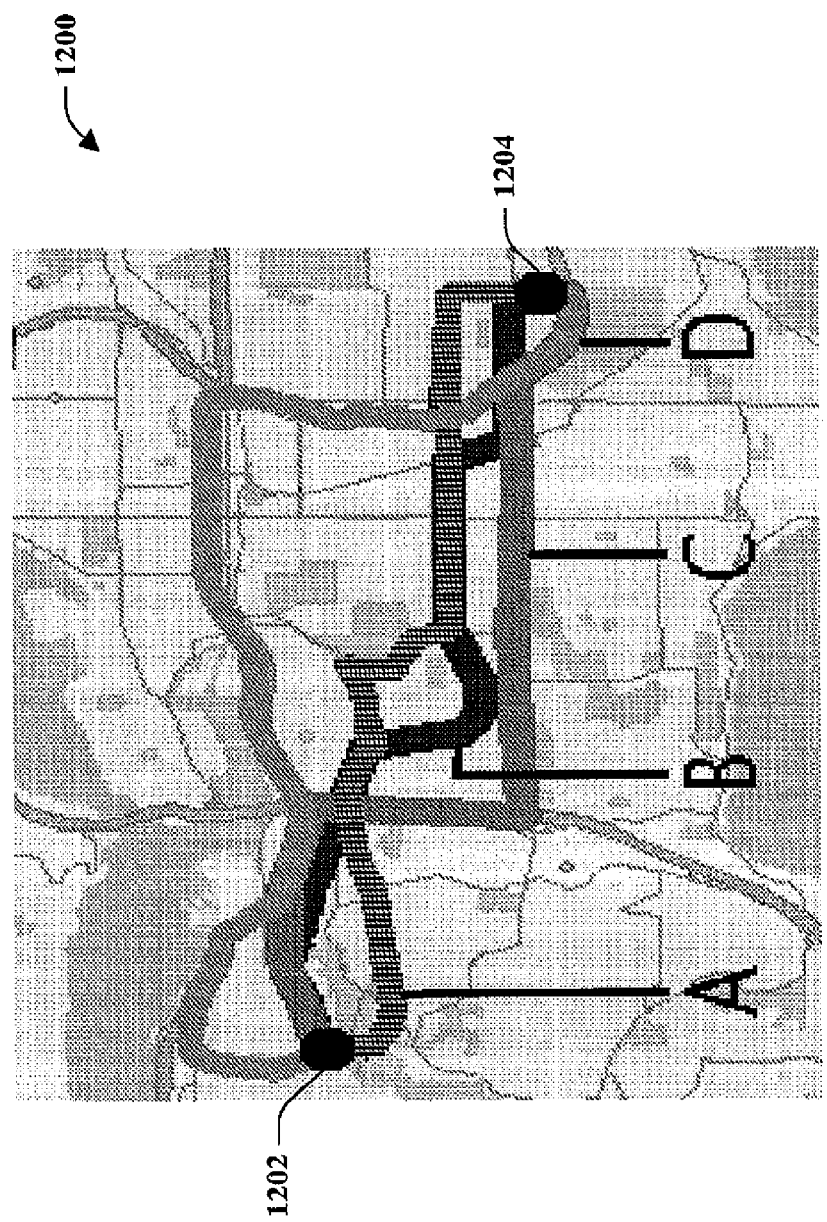
FIG. 12 is a graphical illustration of routes driven by a user familiar with a locale versus routes output by conventional route planning applications.

Referring now to FIG. 12, a graphical representation 1200 of routes output by various route planning applications versus a route actually traveled by a monitored driver (who was familiar with the area) is illustrated. In more detail, routes labeled "B", "C", and "D" were three routes output by three different route planning applications between the same two points. It can be assumed that each of the three route planning applications utilize reasonable metrics in connection with outputting routes. The route labeled "A" is an actual route typically taken by a driver between the same two points (1202 and 1204, respectively). This indicates that the driver utilizing route "A" has preferences, assumptions, and/or knowledge that differs from the knowledge, assumptions, and preferences implicit in the three route planners. Thus it can be discerned that it is desirable to incorporate actual knowledge and/or preferences of a driver into a route planning application.

Figure 13:
FIG. 13 is a graphical illustration of collected data points that are mapped onto a graph of a traffic system.

Referring briefly to FIG. 13, a screenshot 1300 of a mapping application that is overlaid with data points associated with location-sensors in automobiles is illustrated. These data points can be associated with a plurality of different drivers over time. It can also be discerned upon viewing the screenshot 1300 that the data points often do not map to roadways, even though most of such data points were taken from vehicles on such roadways. Therefore, it is important to carefully "snap" these data points to roadways to enable creation of a robust traffic flow representation over different contexts. In one example, a Hidden Markov Model can be utilized in connection with snapping data points to associated road segments.

Figure 15:
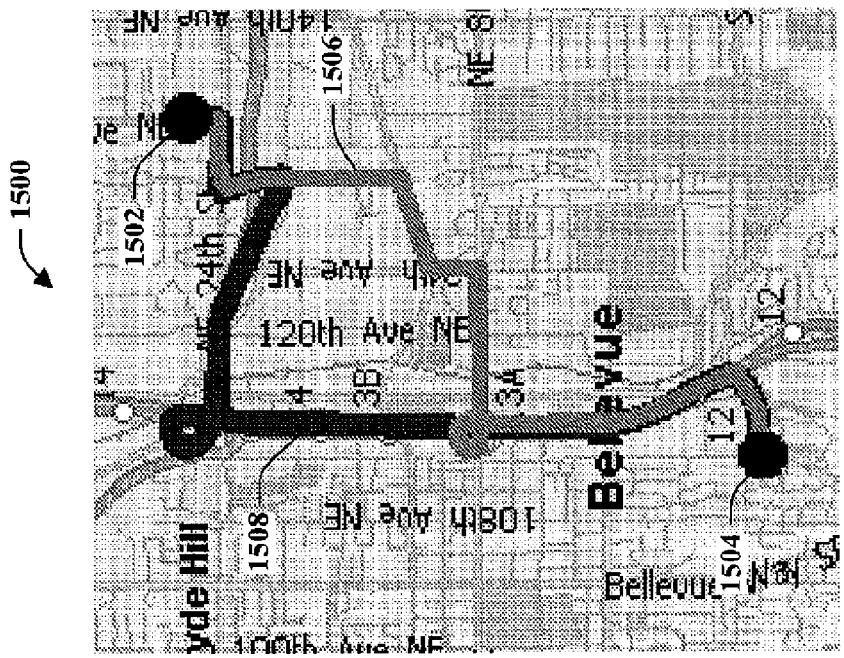
FIGS. 14 and 15 are screenshots that illustrate optimal routes given different times of day.
Figure 14:
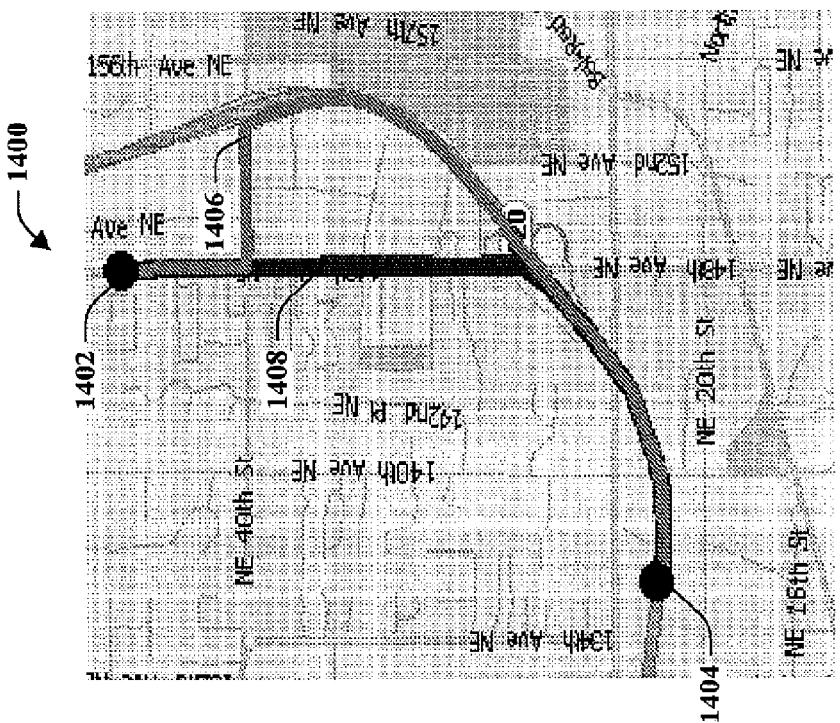

Turning now to FIGS. 14 and 15 collectively, screenshots 1400 and 1500 that illustrate context-dependent routes are illustrated. The screenshot 1400 illustrates two "optimal" routes between the same two points (1402 and 1404, respectively). In more detail, the route 1406 is the optimal route (least time-consuming) during rush-hour, while the route 1408 is the optimal route at midnight. Similarly, the screenshot 1500 illustrates different optimal routes between the same two points (1502 and 1504, respectively) that depend upon time of day. The route 1506 is the optimal route between the points 1502 and 1504 during rush hour, while the route

1508 is the optimal route between the points 1502 and 1504 at midnight. From these screenshots 1400 and 1500 it can be determined that the assumption that optimal routes are context independent (used by conventional route planning systems) does not hold true.

Figure 16:
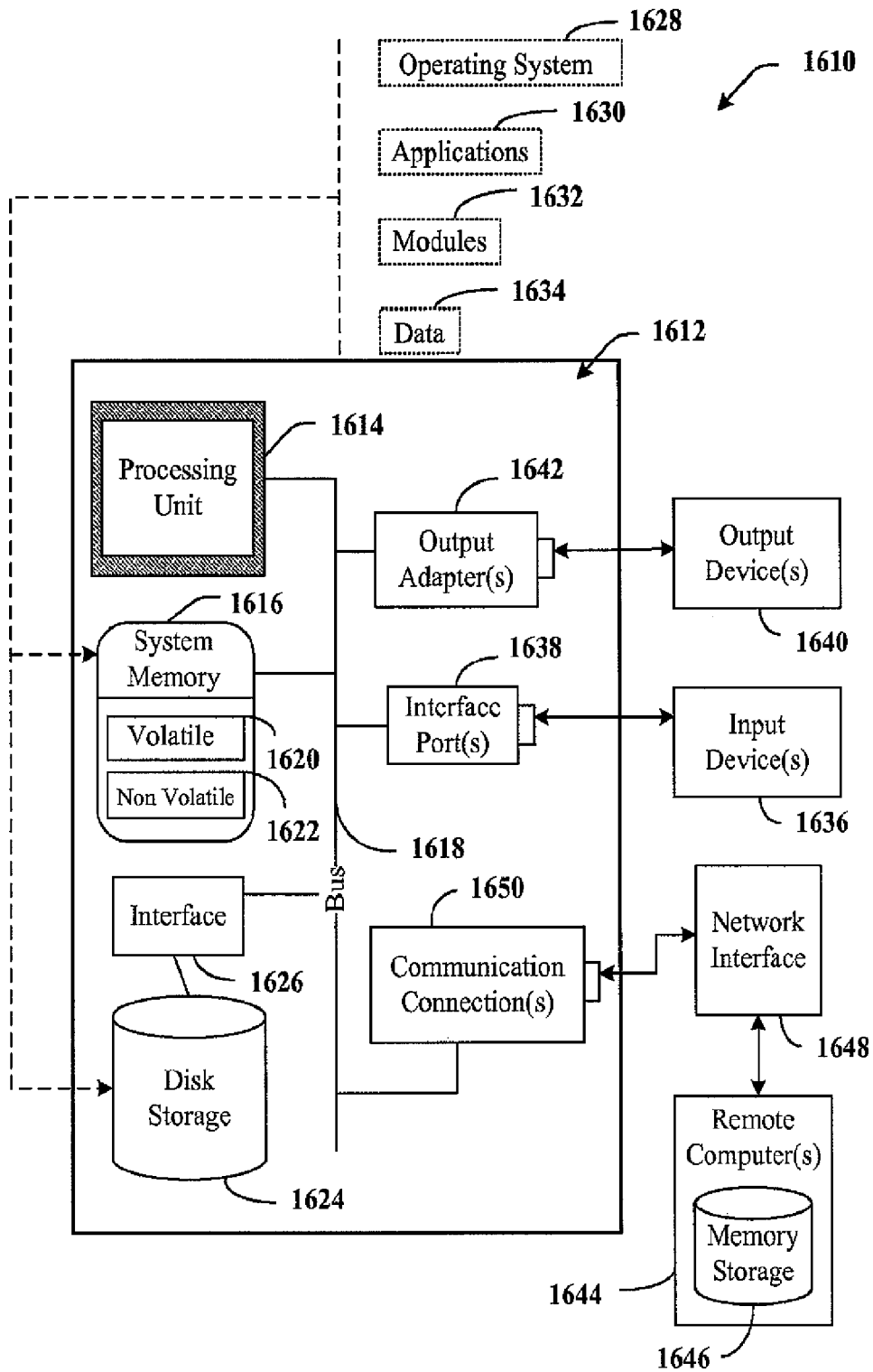
FIG. 16 is a schematic block diagram illustrating a suitable operating environment.

In order to provide additional context for various aspects of the claimed subject matter, FIG. 16 and the following discussion are intended to provide a brief, general description of a suitable operating environment 1610 in which various aspects may be implemented. While the claimed subject matter is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1610 is only one example of a suitable operating environment and is not intended to suggest any limitation as to the scope of use or functionality of the features described herein. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 16, an exemplary environment 1610 that can be employed in connection with creating context-sensitive driving directions includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI). The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable ROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/nonremovable, volatile/nonvolatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). For instance, a DVD-ROM drive can be employed in connection with reading video content from a DVD. To facilitate connection of the disk storage devices 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer system 1612. System applications 1630 take advantage of the management of resources by operating system 1628 through program modules 1632 and program data 1634 stored either in system memory 1616 or on disk storage 1624. It is to be appreciated that the subject invention can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, touch screen, steering wheel buttons, keyboard, microphone, joystick, game pad, satellite dish, scanner, TV tuner card, digital camera, digital video camera, web camera, remote control, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapter 1642 is provided to illustrate that there are some output devices 1640 like monitors, in-dash displays, speakers, and printers among other output devices 1640 that require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and widearea networks (WAN). LAN technologies include Fiber Distributed Data Interface (FDDI), Copper Distributed Data Interface (CDDI), Ethernet/IEEE 802.3, Wireless Lan (e.g., 802.11 and WiMax) Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

Figure 17:
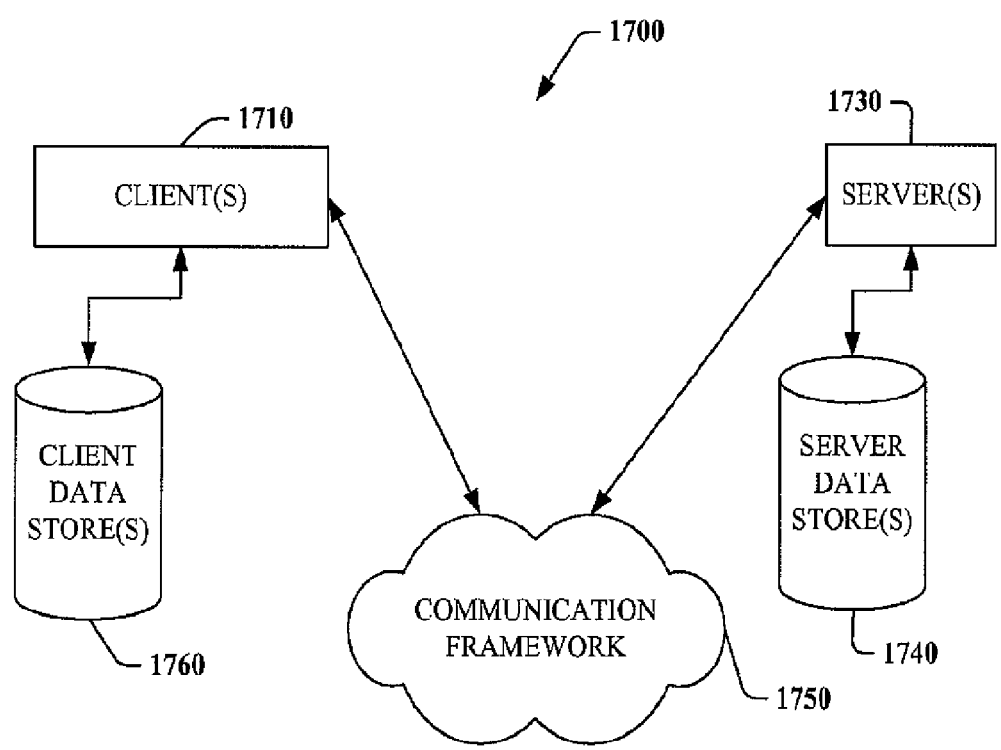
FIG. 17 is a schematic block diagram of a sample-computing environment.

FIG. 17 is a schematic block diagram of a sample-computing environment 1700 with which the claimed subject matter can interact. The system 1700 includes one or more client(s) 1710. The client(s) 1710 can be hardware and/or software (e.g., threads, processes, computing devices). The system 1700 also includes one or more server(s) 1730. The server(s) 1730 can also be hardware and/or software (e.g., threads, processes, computing devices). The servers 1730 can house threads to perform transformations by employing the claimed subject matter, for example. One possible communication between a client 1710 and a server 1730 can be in the form of a data packet adapted to be transmitted between two or more computer processes. The system 1700 includes a communication framework 1750 that can be employed to facilitate communications between the client(s) 1710 and the server(s) 1730. The client(s) 1710 are operably connected to one or more client data store(s) 1760 that can be employed to store information local to the client(s) 1710. Similarly, the server(s) 1730 are operably connected to one or more server data store(s) 1740 that can be employed to store information local to the server(s) 1730. In one particular example, the server(s) can include a route planning system that is accessible to a client by way of a network. Users can request driving directions from the route planning system by submitting a request to the route planning system within the server by way of the client and the network, and the route planning system can then output resultant driving directions to the client.

What has been described above includes examples of the claimed subject matter. It is, of course, not possible to describe every conceivable combination of components or methodologies for purposes of describing such subject matter, but one of ordinary skill in the art may recognize that many further combinations and permutations are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising as comprising" is interpreted when employed as a transitional word in a claim.

What is claimed is:

1. A route planning system comprising:
a processor;
a memory communicatively coupled to the processor, the memory having stored therein computer-executable instructions configured to implement the route planning system including:
a receiver component that receives a request for directions from a first geographical point to a second geographical point;
a profile component that analyzes user-centric data and infers user preferences for directions based on the user-centric data by selecting a profile from a data repository based at least in part on the user-centric data indicating a correspondence between characteristics of the user and characteristics associated with the selected profile; and
a route planner that outputs directions between the first and second geographical points based at least in part upon the received request and the inferred user preferences.

2. The route planning system of claim 1, wherein the user-centric data comprises demographic data of a user initiating the request.

3. The route planning system of claim 2, wherein the demographic data comprises a history of web sites visited by the user.

4. The route planning system of claim 3, wherein the processor comprises a server accessible by the user via a network.

5. The route planning system of claim 3, wherein the route planner selectively outputs directions that avoid areas of high traffic congestion based on the demographic data.

6. The route planning system of claim 1, wherein the user-centric data comprises data from a user calendar.

7. The route planning system of claim 1, wherein the user-centric data comprises historical driving activity of a user initiating the request, the historical driving activity being selected to represent driving on routes familiar to the user.

8. The route planning system of claim 7, further comprising a monitoring component that monitors user activity, the monitoring component recording a trace log comprising data indicative of the historical driving activity.

9. The route planning system of claim 8, further comprising a segmentation component, the segmentation component identifying in the trace log events associated with a start and a stop for each of a plurality of individual journey.

10. The route planning system of claim 8, further comprising a profiling component that determines an inefficiency parameter associated with a driver, the inefficiency parameter indicating an average over each of the plurality of individual journeys, of a ratio between a duration of a fasted fastest expected route and a time spent by the driver on the journey.

11. The route planning system of claim 10, wherein:
the route planner models a traffic system related to the request, the route planner generates the directions using a weighted graph, where nodes of the graph represent intersections and edges represent road segments; and
weights associated with the nodes and edges are based at least in part on the inefficiency parameter for a driver associated with the request.

12. The route planning system of claim 1, wherein the user-centric data comprises an indication of driving experience.

13. The route planning system of claim 1, wherein the processor and memory are mounted within an automobile.

14. A method for operating a route planning system to output outputting directions between two geographic points comprising the following computer-executed acts:
with at least one processor:
tracking historical activity of a driver relating to access of electronic information outside the route planning system;
receiving a request from the driver for driving directions from a first geographic point to a second geographic point;

inferring user preferences based at least in part on the historical activity; and creating driving directions from the first geographic point to the second geographic point based at least in part on the inferred user preferences.

15. The method of claim 14, wherein:

the method further comprises determining contextual data associated with the request; and creating the driving directions comprises creating the driving directions based at least in part on the inferred user preferences and the contextual data.

16. The method of claim 14, wherein:

inferring user preferences further comprises inferring user preferences based at least in part on the historical driving activity comprises analyzing a log of driver activity, the analyzing comprising identifying in the log segments associated with individual journeys and analyzing characteristics of the individual journeys.

17. The method of claim 14, wherein:

the driver comprises a first driver;

the request comprises a first request;

the driving directions comprise first driving directions, the first driving directions indicating a first route between the first geographic point to the second geographic point; and the method further comprises:

receiving a second request from a second driver for driving directions from the first geographic point to the second geographic point; and creating second driving directions for driving directions from the first geographic point to the second geographic point, the second driving directions indicating a second route between the first geographic point to the second geographic point.

18. At least one computer storage medium comprising computer-executable instructions that, when executed by at least one processor, perform a method comprising:

tracking historical driving activity of a driver;

receiving a request from the driver for driving directions from a first geographic point to a second geographic point;

inferring user preferences based at least in part on the historical driving activity, the inferred user preferences being based on determined characteristics of a plurality of journeys, the determined characteristics of each of the journeys comprising an efficiency factor representing a comparison of an efficient route for the journey and actual driver behavior; and creating driving directions from the first geographic point to the second geographic point based at least in part on the inferred user preferences.

19. The at least one computer storage medium of claim 18, wherein:

tracking historical driving activity of the driver includes:

analyzing trace logs with respect to the driver to identify indications of ends of individual journeys for the driver, each indication being based upon the driver's automobile having stopped moving for a threshold amount of time;

segmenting the trace logs to represent the plurality of journeys; and categorizing the segmented trace logs based upon context associated with the trace logs; and creating driving directions includes creating the driving directions based at least in part upon the categorization.

20. The at least one computer storage medium of claim 18, wherein:

inferring user preferences further comprises inferring user preferences for directions based on at least one of demographic data of a user initiating the request and data from a user calendar.

* * * * *